(12) United States Patent  (10) Patent No.: US 7,695,235 B1
Rallis  (45) Date of Patent: Apr. 13, 2010

(54) AUTOMATED WAREHOUSING AND CARGO LOADING SYSTEM

(76) Inventor: John H. Rallis, P.O. Box 3171, Everett, WA (US) 98203

( * ) Notice: Subject to any disclaimer, the term of this patent is extended or adjusted under 35 U.S.C. 154(b) by 0 days.

(21) Appl. No.: 10/624,820

(22) Filed: Jul. 21, 2003

Related U.S. Application Data

(60) Provisional application No. 60/397,471, filed on Jul. 19, 2002.

(51) Int. Cl.
*B65F 9/00* (2006.01)
*B65G 67/00* (2006.01)

(52) U.S. Cl. ............... 414/400; 414/280; 414/661; 414/664; 414/809; 414/392; 414/281

(58) Field of Classification Search ......... 414/398, 414/417, 404, 795.9, 799, 400, 352, 395, 414/492, 514, 796.8, 267, 277, 278, 279, 414/280, 281, 282; 198/468.11, 345.3, 347.1–347.2, 198/347.4, 721, 722, 468.1, 470.1, 746

See application file for complete search history.

(56) References Cited

U.S. PATENT DOCUMENTS

| | | | | |
|---|---|---|---|---|
| 1,830,740 A | * | 11/1931 | Leech et. al. | 414/396 |
| 3,042,230 A | * | 7/1962 | Barski | 414/400 |
| 3,182,823 A | * | 5/1965 | Chasar | 414/281 |
| 3,434,604 A | * | 3/1969 | Bartels et al. | 414/281 |
| 3,613,910 A | * | 10/1971 | Weir | 414/281 |
| 3,727,777 A | * | 4/1973 | Hanson | 414/400 |
| 3,792,785 A | * | 2/1974 | Weir | 414/278 |
| 3,921,828 A | * | 11/1975 | Suizu | 414/280 |
| 3,961,714 A | * | 6/1976 | Buehler | 414/572 |
| 4,093,084 A | * | 6/1978 | Ringer | 414/343 |
| 4,170,292 A | * | 10/1979 | Lang | 198/746 |
| 4,195,959 A | * | 4/1980 | Schmitt | 414/788.9 |
| 4,239,436 A | * | 12/1980 | Wildenaur | 414/276 |

(Continued)

FOREIGN PATENT DOCUMENTS

DE  4309338 C2 *  4/1995

(Continued)

*Primary Examiner*—Gregory W Adams
(74) *Attorney, Agent, or Firm*—Todd N. Hathaway

(57) ABSTRACT

A warehousing system for palletized cargo, and an automated loading/unloading system for use with the same. The warehousing system includes a feed conveyer and a plurality of storage racks. A traveling conveyor carries the cargo from the feed conveyor to the individual racks, and from the racks to a loading/unloading conveyor which carries the cargo to the loading/unloading docks. The traveling conveyor rides on a wheeled chassis that is guided between the receiving and discharge locations on tracks. The storage racks are stackable in tiers, and the traveling conveyor has a deck that raises and lowers to be level therewith. The automated loading/unloading dock includes a rigid, extensible plate having an upper surface for supporting a load of palletized cargo, with a drive mechanism being mounted to the inner end of the plate to translate it in and out of the transport vehicle. The plate carries a load of palletized cargo into or out of the transport vehicle en masse. For loading, restraining doors hold the loaded cargo within the interior of the vehicle as the extensible dock is withdrawn. When unloading, a paddle is deployed above the upper surface of the lock member and is translated towards its inner end so as to push the cargo onto the loading/unloading conveyor.

18 Claims, 13 Drawing Sheets

U.S. PATENT DOCUMENTS

| | | | |
|---|---|---|---|
| 4,277,217 A * | 7/1981 | Miller et al. | 414/395 |
| 4,304,518 A * | 12/1981 | Carder et al. | 414/495 |
| 4,354,786 A * | 10/1982 | Spitler | 414/790.3 |
| 4,372,725 A * | 2/1983 | Moore et al. | 414/460 |
| 4,425,069 A * | 1/1984 | Saur et al. | 414/398 |
| 4,832,559 A * | 5/1989 | Gebbardt | 414/392 |
| 4,844,681 A * | 7/1989 | Pierre et al. | 414/398 |
| 4,848,533 A * | 7/1989 | Martin et al. | 198/470.1 |
| 5,009,560 A * | 4/1991 | Ruder et al. | 414/392 |
| 5,054,987 A * | 10/1991 | Thornton | 414/390 |
| 5,067,867 A * | 11/1991 | Ruder et al. | 414/391 |
| 5,082,415 A * | 1/1992 | Hayashi | 414/343 |
| 5,088,876 A * | 2/1992 | Lifflander | 414/479 |
| 5,181,820 A * | 1/1993 | Sjogren et al. | 414/397 |
| 5,186,596 A * | 2/1993 | Boucher et al. | 414/395 |
| 5,325,953 A * | 7/1994 | Doster et al. | 198/304 |
| 5,346,352 A * | 9/1994 | Ito | 414/400 |
| 5,472,309 A * | 12/1995 | Bernard et al. | 414/807 |
| 5,489,185 A * | 2/1996 | Reichert | 414/795.9 |
| 5,562,403 A * | 10/1996 | Winski | 414/799 |
| 5,577,873 A * | 11/1996 | Tanaka et al. | 414/400 |
| 5,615,992 A * | 4/1997 | Proske et al. | 414/807 |
| 5,887,699 A * | 3/1999 | Tharpe | 198/367 |
| 5,921,740 A * | 7/1999 | Stewart | 414/399 |
| 6,056,497 A * | 5/2000 | Holz | 414/492 |
| 6,139,240 A * | 10/2000 | Ando | 414/267 |
| 6,357,985 B1 * | 3/2002 | Anzani et al. | 414/331.05 |
| 2003/0021670 A1 * | 1/2003 | Harris et al. | 414/799 |

FOREIGN PATENT DOCUMENTS

JP    56033315 A  *  4/1981

* cited by examiner

AUTOMATED WAREHOUSING AND CARGO LOADING SYSTEM

This application claims the benefit of U.S. Provisional Application(s) No. 60/397,471 filing date Jul. 19, 2002.

BACKGROUND OF THE INVENTION a. Field of the Invention

The present invention relates generally to material handling systems and, more particularly, to an automated warehousing system and an automated cargo loading system for the loading/unloading of palletized freight, bales and the like onto/from truck trailers or similar transport vehicles.

b. Background Art

It is common practice among major shipping companies, as well as large retail chains, manufacturers, and food processors, to maintain warehouse facilities that serve as national or regional distribution centers for the interim storage and distribution of goods. In general, the large quantities of goods being shipped and received at these warehouses demands that a significant portion of the facility be dedicated not only to storage but also to the transport operation which requires numerous truck docking bays and the associated floor space for loading and unloading goods to the transport vehicles. The cost of purchasing, constructing and maintaining the dedicated portions of the facility contributes significantly to the cost of the warehouse operation, and, during down-time, occupies valuable space that could be used in a more productive manner.

Another disadvantage of conventional warehouse shipping facilities is the quantity and cost of labor required to perform the shipping and receiving functions. Usually one forklift operator delivers the palletized goods from production to storage. Another is required to retrieve palletized goods from inventory and deliver it to the loading dock. Yet another forklift operator then loads the pallets into the transport vehicle while the first returns to inventory to retrieve additional palletized shipments. Considering the number of docking bays and transport vehicles which may be operating simultaneously, the direct labor costs quickly accumulate. Because many of these operations employ highly paid unionized labor, the labor costs are especially significant.

The cost of operating a conventional forklift warehouse and loading operation is further increased by the time-consuming nature of this labor-intensive process. The time demand adds to the direct labor costs and ties up the trucks or other transport vehicles, delaying shipments, increasing delivery times, and adding to the transportation costs. Still more costs are realized by the capital expenditure to purchase the forklifts, and the cost of maintaining, fueling, and insuring such equipment.

Accordingly, there exists a need for an apparatus and method which reduces the necessary dedicated floor space and loading docks required in warehouse shipping/receiving operations. Furthermore, there exists a need for such an apparatus and method which reduces the direct labor personnel and associated labor costs required for such an operation to function. Still further, there exists a need for such an apparatus and method that performs more efficiently than the conventional forklift operation, thus reducing down time, delivery delays, and transportation costs.

SUMMARY OF THE INVENTION

The present invention has solved the problems cited above, and is a warehousing system having automated cargo storage and loading/unloading systems. The invention is designed to operate in conjunction with, or as a replacement for, the conventional forklift loading operations typically found in warehouse type facilities. By its implementation, the warehouse operational costs can be significantly reduced through greater loading efficiency, reduced personnel and associated labor costs, reduced dedicated floor space, and fewer truck docking bays.

The automated cargo loading system of the present invention is designed to operate on bundled freight supported on portable platforms such as conventional loading pallets. Since this is the typical cargo load configuration used in conventional forklift operations, little if any modification is required to ship standard palletized freight loads using the present invention. As used in the following description and claims, the terms "pallet" and "palletized" include not only cargo carried on conventional wooden pallets, but also all forms of cargo bundled and carried on a support in a similar manner.

Broadly, the warehousing system comprises: (a) a feed conveyer for bringing palletized cargo to or from the system; (b) a plurality of storage racks for storing the palletized cargo; (c) a loading/unloading conveyor for bringing the palletized cargo from or to at least one loading/unloading dock; (d) a traveling conveyor for carrying individual loads of the palletized cargo; and (e) means for selectively moving the traveling conveyor between (i) a location in which the traveling conveyor is aligned with the feed conveyor for receiving or discharging the palletized cargo to or from the feed conveyor; (ii) locations in which the traveling conveyor is aligned with the storage racks for receiving or discharging the palletized cargo from or to the storage racks; and (iii) a location in which the traveling conveyor is aligned with the loading/unloading conveyor for receiving or discharging the palletized cargo from or to the loading/unloading conveyor.

The storage racks may be stacked in tiers at a plurality of elevations, and the traveling conveyor may comprise a conveyor deck for holding loads of the palletized cargo, and means for elevating the conveyor deck to heights level with the storage racks in the tiers. The means for elevating the conveyor deck may comprise a screw jack mechanism mounted to the conveyor deck.

The means for selectively moving the traveling conveyor may comprise: a wheeled chassis having the conveyor deck mounted thereto, and at least one track for guiding the wheeled chassis between the locations in which the palletized cargo is received or discharged.

The feed conveyor may further comprise a branch portion that diverges from a lead portion of the feed conveyor, for bringing the cargo directly to or from the loading/unloading conveyor without passing to the traveling conveyor. The feed conveyor may further comprise a means for selectively diverting the palletized cargo from the main portion of the feed conveyor onto the branch portion of the conveyor.

The branch portion of the conveyor may comprise: a bypass segment connecting the branch portion of the feed conveyor and the loading/unloading conveyor, and means for displacing the bypass segment so as to form a gap between the branch portion of the feed conveyor and the loading/unloading conveyor for receiving the traveling conveyor therein when the traveling conveyor is in the location for receiving or discharging the palletized cargo from or to the loading/unloading conveyor.

The at least one loading/unloading dock may be an automated cargo loading/unloading system, as also provided by the present invention.

The automated cargo loading and unloading system comprises, (a) a rigid, extensible dock member having an upper surface for supporting a plurality of loaded cargo pallets; (b) means for extending the dock member into an interior of a transport vehicle so as to carry the plurality of cargo pallets into and out of the interior of the vehicle en mass; and (c) means for selectively restraining the plurality of cargo pallets within the interior of the vehicle as the extensible dock member is withdrawn therefrom. The dock member may be configured to slide under a plurality of loaded cargo pallets within an interior of a vehicle as the dock member is extended, and then carry the plurality of cargo pallets out of the interior of the vehicle as the dock member is withdrawn therefrom.

In a preferred embodiment, the system may comprise: (a) a point of inventory (POI) floor conveyor providing their transports loaded cargo pallets between a source location, such as a storage unit or production line, and a feed control (FC) conveyor, (b) a feed control (FC) conveyor that provides controlled sequential transfer of the palletized cargo between the POI conveyor and a dock transfer (DT) conveyor, (c) a dock transfer (DT) conveyor that moves the palletized cargo from the FC conveyor into alignment with an extensible dock, providing a staging platform for one or more palletized loads being transferred to or from the extensible dock, (d) a feed control sensor, operating in conjunction with the FC conveyor, that controls the feed of palletized cargo to the DT conveyor, (e) a dock loading mechanism that provides controlled sequential transfer of one or more palletized loads from the DT conveyor to the extensible dock, (f) an extensible dock that transfers one or more palletized loads en mass to and from the containment receptacle of a transport vehicle, the extensible dock element having a wedged leading end that allows insertion under grouped pallet loads in the containment receptacle for extraction during the unloading operation, (g) a support frame that provides structural support for the extensible dock and the accumulated pallets carried thereby during the loading/unloading operation, (h) a dock unloading mechanism that provides controlled sequential transfer of loaded pallets from the extensible dock to the DT conveyor during the unloading operation, (i) a cargo restraining mechanism that provides retractable means for restraining palletized cargo within the containment receptacle as the extensible dock is retracted after loading, and (j) computer control means providing operational control and synchronized operation of the components of the system.

The extensible dock serves as the primary loading element for transferring palletized cargo between the conveyor elements and the containment receptacle of the transport vehicle. In a preferred embodiment, the containment receptacle comprises a box trailer pulled by a truck or tractor, and the extensible dock, as well as other elements of the automated cargo loading system, may be configured according to the specifications of the trailer or other containment receptacles specifically employed for this service.

The extensible dock element may comprise a horizontally disposed, rectangular, structural plate sized for sliding insertion along the entire length of a longitudinally aligned trailer bed. A linear array of horizontally disposed rollers, each aligned normal to the dock length, may be disposed in a support frame so as to support the dock plate from underneath. The rollers provide vertical and lateral dock restraint while allowing the longitudinal movement necessary for sliding insertion into the trailer. A wedge on the leading edge of the dock plate, formed by tapering the upper surface on the distal end, enables the dock to lever under palletized cargo or bales when forcibly extended. To reduce friction between the wedge and cargo an array of anti-friction elements, such as encapsulated ball bearings, may be inset on the wedge so that the upper bearing surfaces thereof protrude slightly from the wedge face. Additional anti-friction elements, such as horizontally disposed, laterally aligned rollers, may protrude from the upper face of the main dock plate, so as to allow the cargo pallets to travel easily along the length of the dock but restrict their lateral movement due to frictional contact with the rollers.

A set of laterally opposed structural arms may extend outwardly then downwardly from the trailing end of the extensible dock in an outrigger arrangement. A set of motorized wheels or cogs may be mounted proximate the end of each outrigger arm and configured to engage tracks or stationary toothed racks longitudinally aligned along the length of the dock and secured to a foundation. The wheels or cogs may be driven by electric motors, and a retractable power cord may supply power to each motor as the dock extends and retracts.

The support frame may comprise a rectangular boxed framework secured to the foundation and sized and positioned to correspond generally to the downward projection of the dock plate in its retracted position. A linear array of horizontally disposed rollers, aligned normal to the dock length, may be affixed along the top face of the support frame to support the dock as previously described. In its retracted position, the dock plate is preferably longitudinally centered on the support frame, but rotation of the motorized drive wheels or cogs extends the dock plate longitudinally forward relative to the frame. In the extended position, the dock plate cantilevers off the end of the frame such that the wedged leading edge of the dock plate enters the aligned trailer and is supported by the trailer bed.

The dock unloading element may comprise a generally rectangular paddle, laterally disposed across the top surface of the dock plate. A pair of extension arms, one mounted to each lateral end of the paddle, may be connected to corresponding motorized drive chains on each side of the support frame that longitudinally translate the unloading paddle along the top surface of the dock plate. When directed by the control computer, palletized cargo that is supported atop the rollers of the dock plate is removed from the retracted dock onto the DT conveyor by the urging translation of unloading the paddle towards the tail end of the dock. When all cargo has been removed, the paddle motion is reversed until the paddle approaches the leading end of the dock; by continued activation of the chain drives the paddle may be rotated off the leading end of the dock and to a stowed position below the dock plate adjoining the end of the support frame. With the unloading paddle in the stowed position, the dock may be extended as required.

Palletized cargo is transported to and from the dock via communicating conveyor elements. A staging area for palletized cargo being loaded to or unloaded from the rearward end of the extensible dock is provided by the dock transfer (DT) conveyor element. The DT conveyor may comprise a section of standard reversibly powered rollers, the operation of which is preferably controlled by the system computer. The DT conveyor runs perpendicular to and adjoins the tail end of the extensible dock plate when the latter is in the retracted position. The length of the conveyor segment may correspond to the width of the dock plate, which for tractor-trailers may generally accommodate two standard pallet loads.

Adjoining the ends of the DT conveyor are first and second corresponding feed control (FC) conveyors, each of which may comprise a reversibly powered conveyor element with a flexible belt. The flexible belt serves as a frictional stop for approaching loaded pallets and provides a frictional take off surface for advancing the pallets to adjoining sections of conveyor. As will be discussed below, the rate and sequence of pallet loads transferred to the DT conveyor are preferably controlled by the system computer.

Adjoining the outer end of each FC conveyor is a point of inventory (POI) conveyor that provides transport of loaded pallets between the FC conveyor and source locations, such as storage units or production lines. The POI conveyor may comprise a network of interconnected sections of standard gravity feed rollers and powered conveyor units directed and configured to accommodate the layout and operational requirements of the facility in which it is installed. Although a single POI conveyor network may be sufficient for many installations, a POI conveyor opposingly directed from each FC conveyor may provide additional flexibility.

During the loading operation, cargo travels via the conveyor elements to the dock staging area provided by the DT conveyor. The dock loading mechanism adjoins the side of the DT conveyor opposite the dock, providing means for transferring palletized cargo from the DT conveyor to the dock plate. The dock loading mechanism may comprise a vertically oriented push plate aligned parallel to the frame of the DT conveyor and with a width corresponding to the length of the DT conveyor. The push plate may be mounted on one or more horizontally disposed hydraulic actuators, aligned generally parallel with the length of the dock and normal to the DT conveyor, so that when the actuators are extended, the push plate will contact any pallets on the DT conveyor and transfer them to the retracted dock plate. The actuators are then retracted to return the push plate its position behind the conveyor frame, allowing succeeding pallets to load onto the DT conveyor for subsequent displacement onto the dock plate.

During loading, the flow of pallets from the FC conveyor to the DT conveyor is controlled by the feed control sensor in conjunction with the control computer. The feed control sensor may comprise a pair of optical sensors, one mounted proximate each lateral edge of the push plate and configured to detect the presence of a loaded pallet on the DT conveyor. As pallets sequentially feed from the POI conveyor to the FC conveyor, the pallets contact the FC conveyor's rubber belt and, due to frictional engagement, abruptly assume the FC conveyor's speed. The FC conveyor may be running or stopped, as dictated by computer processed signals from the feed control sensors, and the palletized cargo may respectively be transported to the DT conveyor or temporarily delayed. When either sensor fails to detect a pallet, the FC conveyor continues to operate, transferring cargo to the DT conveyor. However, when both sensors are blocked, indicating that cargo pallets have filled the DT conveyor, the FC conveyor is shut down, restricting the flow of additional pallets. The pallets are then transferred from the DT conveyor to the dock plate by activation of the dock loading mechanism. When the actuators on the dock loading mechanism retract, the optical sensors reset, the FC conveyor restarts accordingly, and the loading sequence resumes.

Palletized loads accumulated on the dock are transferred en mass to the transport vehicle trailer by fully extending the dock plate into the trailer bed. The cargo restraining mechanism is deployed to restrain the load within the trailer when the dock plate is subsequently retracted. The cargo restraining mechanism may comprise a set of motor or hydraulically driven, hinged gates, opposingly mounted on the vertical posts defining the truck bay door frame. The restraining mechanism gates may be configured to opposingly rotate about vertical axes, so that when the gates swing closed the cargo entrance to the trailer is obstructed: as the dock plate is subsequently retracted, the restraining mechanism blocks the palletized load from exiting the trailer allowing the dock plate to slide out from underneath the palletized cargo and depositing the cargo on the trailer bed. The gates may then counter-rotate to an open, stowed position allowing access to the trailer doors.

The computer control system provides automated means for controlling and sequencing the various components of the cargo loading system. Its implementation allows a single operator to control the entire operation, thus reducing personnel and the associated labor costs. The computer for the control system may be housed in a control console attended by the operator and appropriate cabled connections may allow the computer to communicate with the following components; the motors driving the FC conveyor belt, the motors driving the DT conveyor rollers, conveyor control sensors, the dock loading mechanism actuators, the dock wheel motors, the motors for the sprockets driving the dock unloading mechanism, and the hinge motors on the cargo restraining mechanism.

The program logic controlling the computer's operation is best understood by reference to the loading and unloading processes. During loading, palletized cargo is sequentially placed on the POI conveyor at a source location, such as a storage area, and transferred to the FC conveyor by a combination of powered and gravity feed rollers. When the first pallet arrives at the FC conveyor, the FC conveyor will be running, and the first pallet will immediately be transferred to the DT conveyor by the FC conveyor's rubber belt. During the entire loading operation, power to the DT conveyor's powered rollers is suspended. Thus the first pallet will simply roll on the DT conveyor by its own momentum. If the pallet reaches the opposite end of the DT conveyor, either by momentum or the urging of ensuing pallets, the rubber belt on the opposing FC conveyor, rendered inoperative by the computer control system, will arrest its forward motion. Subsequent pallets will be transferred to the DT conveyor in the same manner until both feed control sensors, located at either end of the loading mechanism's push plate, become obstructed by cargo loads. When both sensors are blocked, indicating that cargo pallets have filled the DT conveyor, the FC conveyor is shut down, restricting the flow of additional pallets to the DT conveyor. The pallets may then be transferred from the DT conveyor to the retracted dock plate by activation of the dock loading mechanism.

Prior to commencing the loading process, the computer control system assures that the dock plate is in the retracted position, and initializes the unloading paddle which acquires a start position adjoining the tail end of the retracted dock. The unloading paddle serves as a backstop for the onloading pallets and restrains excessive forward travel. As the DT conveyor transfers pallets to the dock plate, the unloading paddle simultaneously translates a stepped incremental distance, equivalent to the pallet length, towards the leading end of the dock plate. Thus, the paddle makes room for the oncoming pallets, but prevents them from inadvertently traveling off the end of the dock.

Once the first set of pallets have loaded, the dock loading mechanism will retract and the optical feed sensors will reset. This reinitiates the FC conveyor operation which begins feeding the next batch of pallets to the DT conveyor. The cycle continues until the unloading paddle reaches a terminal position adjoining the leading edge of the dock plate. The computer registers this occurrence, which indicates that the dock is full, and suspends operation of the dock loading mechanism until the pallets on the loaded dock are transferred to the trailer.

If the trailer is already docked, the unloading paddle is rotated into its stowed position in preparation for loading the trailer. Otherwise, the unloading paddle remains in position to secure the end of the loaded dock until the trailer arrives. Once the trailer arrives, it is backed into the docking bay and aligned with the dock plate using a combination of visual and electronic alignment means. The unloading paddle is then stowed, and the loaded dock plate is fully extended into the bed of the trailer. After activating the gates on the cargo restraint mechanism, the dock plate is retracted, depositing the cargo load on the trailer bed. Once the dock plate retracts, the dock loading mechanism can be retracted to reload the dock plate in preparation for the next trailer shipment.

When unloading is required, the dock plate is retracted, the unloading paddle is stowed, and the loaded trailer is aligned in the docking bay as previously discussed. The dock plate is then extended into the trailer such that its wedged leading end is forcibly levered between the trailer bed and the palletized trailer load. Once the truck load of pallets is resting on the dock plate, the dock plate is retracted. At this point, the motorized rollers on the DT conveyor and FC conveyor are activated, and the unloading paddle begins to operate. The unloading paddle sequentially transfers individual rows of pallets to the DT conveyor by translating towards the tail end of the dock in stepped increments equal to the pallet length. Rows of pallets entering the DT conveyor are transported by its powered rollers to the FC conveyor which relays the cargo to the POI conveyor. Once on the POI conveyor, the pallets are directed to the appropriate destination. This process continues until all the pallets have been removed from the dock plate, at which time the system may reinitiate in preparation for the next operation.

By this automated system, a single person can control the operation, in which loading and unloading times are greatly reduced in comparison to conventional forklift operations. Because of the significant increase in efficiency, far fewer docking bays and less floor space is required to obtain even greater throughput. This translates into reduced labor costs, fewer shipping delays, lower transportation costs, and greater overall cost efficiency for the shipping/receiving operation.

The invention, together with further aspects and advantages thereof, may be further understood by reference to the following detailed description and accompanying drawings.

DETAILED DESCRIPTION a. Overview

Figure 1:
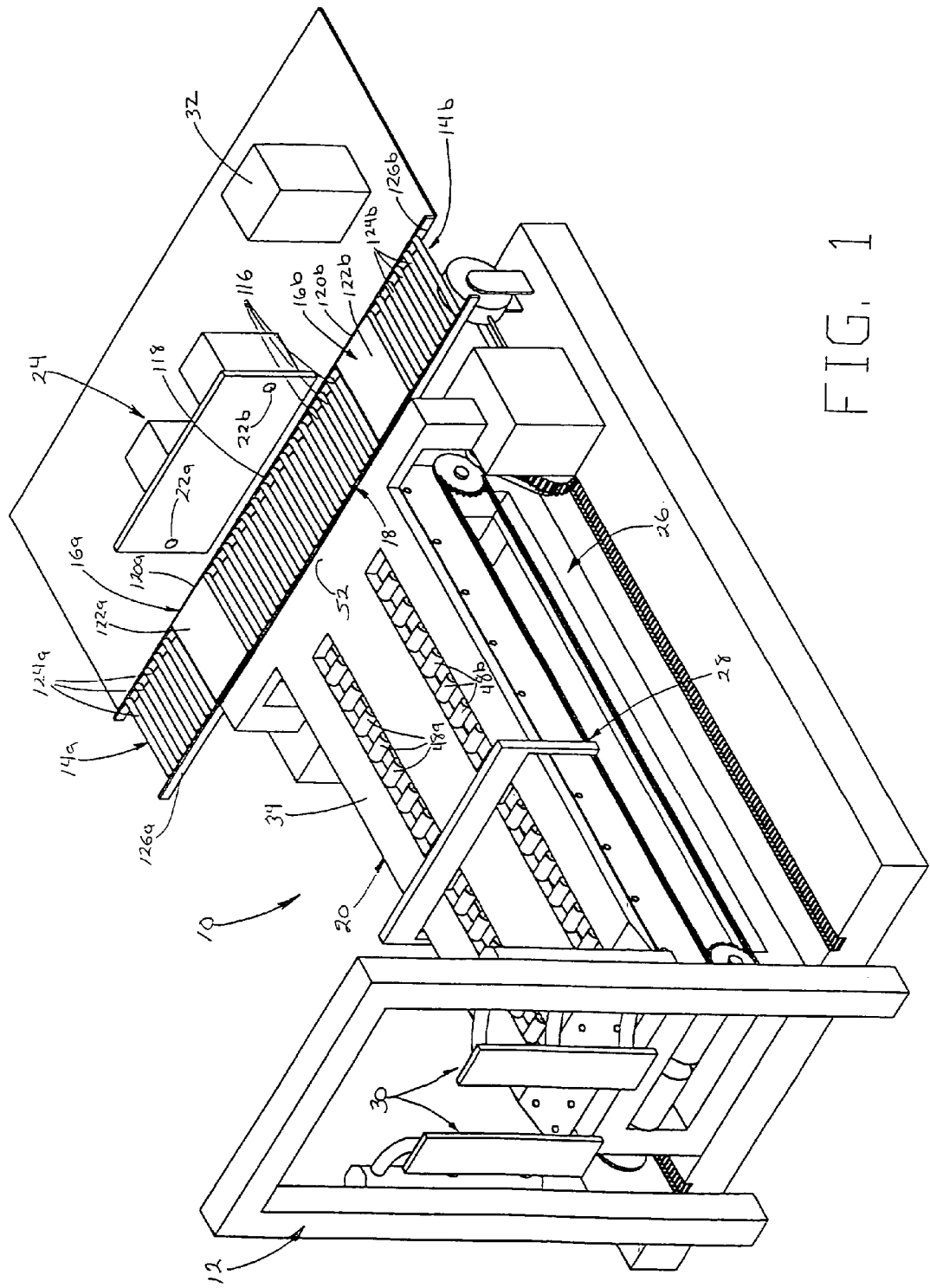
FIG. 1 is an isometric front view of a automated cargo loading system in accordance with the present invention.

FIG. 1 shows an automated cargo loading system 10 in accordance with the present invention, installed adjoining a truck docking bay door frame 12 in a typical warehouse facility. In the preferred embodiment, the invention comprises the following major elements which perform the following functions: The point of inventory (POI) conveyors 14a,b transport palletized goods between a source location, such as a storage unit or production line, and the feed control (FC) conveyors 16a,b. The feed control (FC) conveyors 16a,b provide controlled, sequential transfer of the palletized cargo between the POI conveyors 14a,b and the dock transfer (DT) conveyor 18. The dock transfer (DT) conveyor 18 moves palletized cargo from the FC conveyors 16a,b into alignment with the extensible dock 20 and serves as a staging platform for palletized loads being transferred to or from the extensible dock 20. The feed control sensors 22a,b, which operate in conjunction with the FC conveyors 16a,b, control the feed of pallets to the DT conveyor 18. The dock loading mechanism 24 sequentially transfers rows of palletized cargo from the DT conveyor 18 to the extensible dock 20. The extensible dock 20 serves as a freight transfer platform upon which palletized cargo is accumulated for transfer between the transport vehicle and the DT conveyor 18. The support frame 26 provides structural support for the extensible dock 20 and supports the dock unloading mechanism 28. The dock unloading mechanism 28 sequentially transfers loaded pallets from the extensible dock 20 to the DT conveyor 18 during the unloading operation. The cargo restraining mechanism 30 provides retractable means for restraining palletized cargo within the containment receptacle of the transport vehicle when the extensible dock 20 is being retracted after loading. The computer control system 32 provides operational control and synchronized operation of the aforementioned components.

The sizing and configuration of these various elements depends upon the details of the specific facility in which the cargo loading system 10 is installed, as well as the particular type and size of transport vehicle employed for the shipping operation. In the preferred embodiment the system is configured for loading and unloading a truck trailer, which as shown in the drawings is referred to as a "dry van" and (in the United States) is employed in standard (outside) widths of about 8 feet (96 inches and about 8.5 feet (102 inches), with the palletized cargo conventionally being sized to fill the interior width of such dry vans either two abreast or singly, most commonly being mounted on standardized, nominal 4-foot pallets (e.g., 48×40 inches), employed singly or joined together. However, size and configuration modification may be implemented to accommodate various transport vehicles and facility layouts; for example, the extensible dock may be configured to extend laterally (i.e., sideways) onto a railroad flatcar rather than longitudinally into a truck trailer.

(b) Extensible Dock

Figure 2:
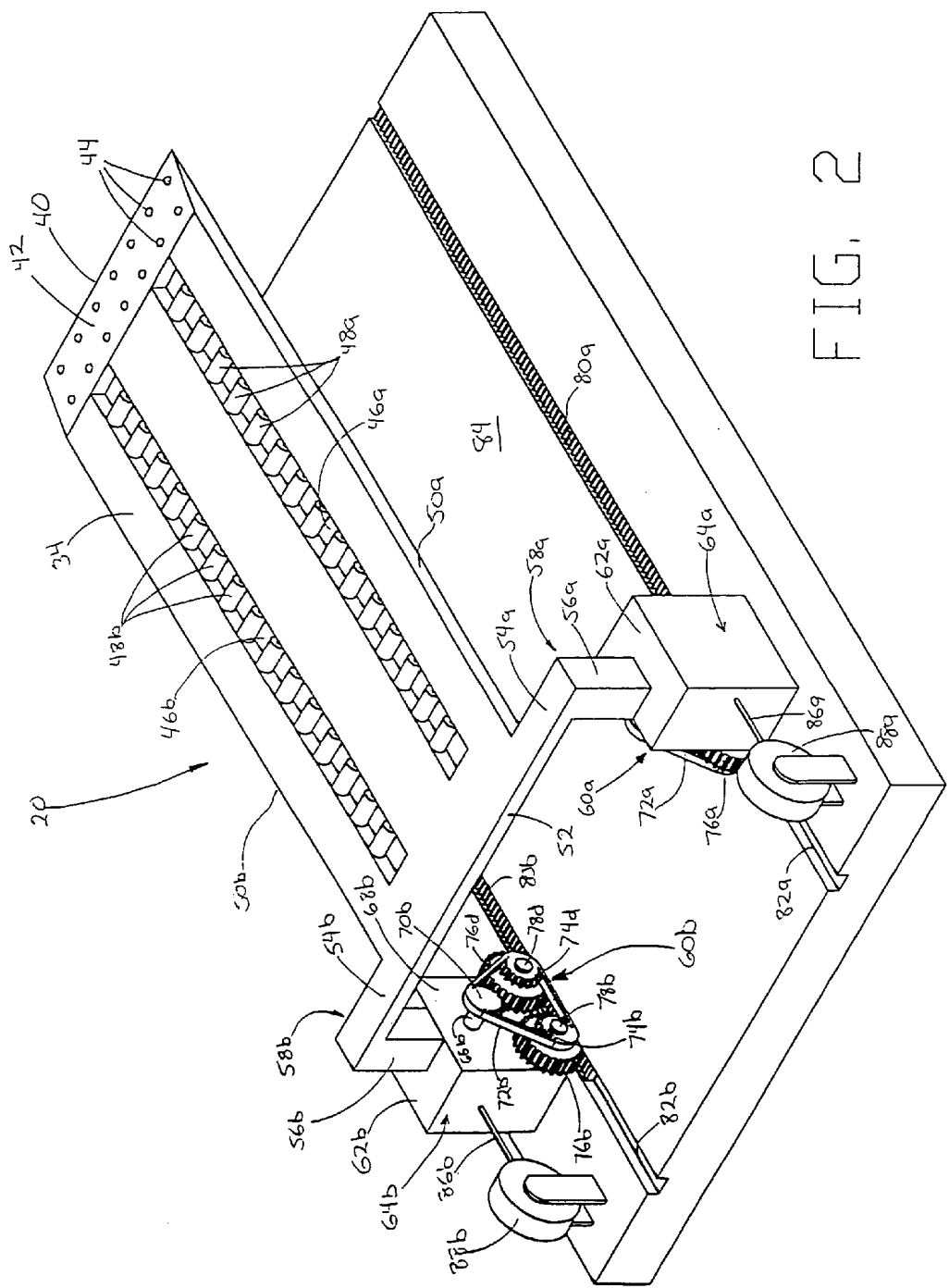
FIG. 2 is an isometric rear view of the extensible dock of the automated cargo loading system of FIG. 1.
Figure 3:
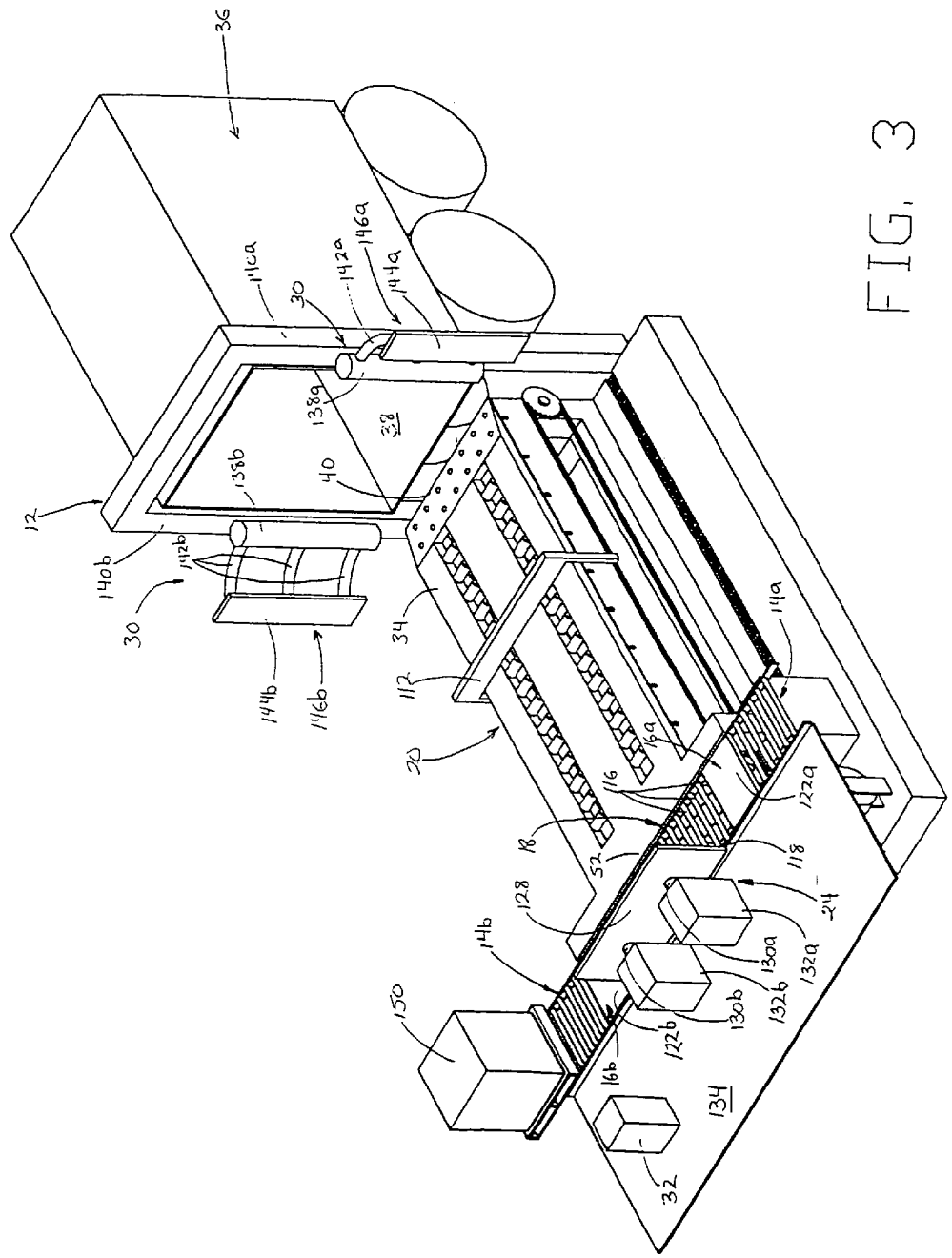
FIG. 3 is an isometric rear view of the automated cargo loading system of FIG. 1, installed adjoining the door frame of a truck docking bay with a trailer aligned for loading/unloading.

Referring also to FIG. 2, in the preferred embodiment, the extensible dock 20 comprises a horizontally disposed, rectangular, steel plate 34 of suitable thickness to provide the structural strength necessary for supporting and transferring a full trailer load of cargo. As shown in FIG. 3, the plate is configured to enter the box of a trailer 36 backed into and aligned with the door frame 12 of the docking bay. Accordingly, the width of the plate 34 is somewhat smaller than the inner dimensions of the trailer box width, and in general is configured to equate to a multiple factor of the cargo pallet width. In the preferred embodiment, the dock plate 34 is two standard pallet widths wide. The supported height of the plate is configured such that the bottom surface of the plate slides on the bed 38 of the trailer 36 when extended, and the length of the plate is configured with respect to the trailer length such that when fully extended, a full trailer load of pallets can be deposited to or extracted from the trailer box. Moreover, hydraulic jacks or other leveling mechanisms (not shown) may be mounted under the dock or its supports to adjust the height of the dock to match that of the bed, if necessary.

The plate's leading end 40 has a beveled edge on its top surface, forming a wedge 42 that can be levered under palletized cargo in the trailer 36 when the plate 34 is forcibly extended. An array of commercially available bearing inserts 44, each comprising a ball bearing embedded in a retaining sleeve, are pressfit into holes on the surface of the wedge 42 such that they subtly protrude from the wedge face. The bearing inserts 44 reduce friction between the wedge 42 and cargo pallets, thus reducing the force necessary to lever the plate 34 between the pallets and trailer bed 38. Friction against the underside of the plate, in turn, is minimized by the smooth metal floor that is characteristic of modern trailers.

A pair of parallel, longitudinally aligned, rectangular slots 46*a,b* extend through the face of the dock plate 34 and provide a recess for installation of two parallel arrays of anti-friction rollers 48*a,b*. The rollers 48*a,b* may be commercially available industrial rollers installed with their axle ends seated in correspondingly opposed circular apertures that are inset in the sides of each slot. The rollers 48*a,b* are configured to protrude slightly above the plane of the dock plate's upper surface, allowing cargo to travel easily along the length of the dock, but restricting lateral movement by frictional contact. The rollers are also spaced longitudinally from the bearings on the distal end of the dock plate and the conveyer rollers proximate the base end, so as to create short "dead spots" where the pallets are temporarily arrested by frictional engagement with the upper surface of the plate, so as to prevent the pallets from "sliding" off of the ends of the dock plate until they are moved by positive pressure exerted by the loading/unloading mechanisms of the assembly.

On each lateral edge 50*a,b* of the dock plate 34, and adjoining its tail end 52, a horizontal steel plate 54*a,b* extends laterally and is welded to a vertical steel box beam 56*a,b* to form a pair of laterally opposed outrigger arms 58*a,b*. The horizontal steel plates 54*a,b* may be integral extensions of the dock plate 34 or separate parts connected to it by welding or other conventional means. The length of the horizontal plates 54*a,b* is configured to assure no interference occurs between the dock's drive assemblies 60*a,b* and the dock support frame 26 (see FIG. 1). With the height of the dock plate 34 dictated by the height of the trailer bed 38, the vertical steel box beams 56*a,b* are sized to span the vertical height difference between the horizontal plates 54*a,b* and the top panels 62*a,b* of welded, rectangular steel boxes which form structural motor housings 64*a,b* for the dock's drive assemblies 60*a,b*. The connection between the box beams 56*a,b* and motor housings' top panels 62*a,b* may be formed by welding or other conventional means.

The drive assemblies 60*a,b* provide the means for extending and retracting the dock 20 during the loading/unloading operation. Accordingly, a reversible, electrical stepper motor (not shown) is secured within each motor housing 64*a,b* with its drive shaft 66*a,b* extending laterally inward from the housings' inner side panels 68*a,b*. Toothed gears 70*a,b*, mounted on the end of each shaft 66*a,b*, drive toothed belts 72*a, b* that each engage an additional pair of toothed gears 74*a-d* that are concentrically coupled to drive pinions 76*a-d*. The drive pinions are mounted on rotating shafts 78*a-d* which are secured within each housing 64*a,b* and extend laterally inward from the inner side panel 68*a,b*. The drive pinions 76*a-d* engage and ride on a pair of toothed racks 80*a,b*, which are in turn secured within elongated slots 82*a,b* formed in a concrete foundation 84 and aligned along the dock length. When power is supplied to the stepper motors, the drive pinions 76*a-d* rotate and drive the dock 20 along the engaged racks 80*a,b*.

Alternatively, the drive assemblies may employ friction wheels, such as hard rubber tires, riding in channel tracks, rather than the pinions and toothbed racks shown in the figures. In such embodiments, the friction wheels are preferably sized to fit tightly against the sides of the channel tracks for stability, and the spaced length (i.e., "wheel base") between the forward and rearward wheels in each pair of drive wheels cooperate with the channel to prevent the assembly from rocking to one side or the other and becoming misaligned.

Connections for electrical power and wired interfaces to the control computer 32 are supplied to the stepper motors by retractable, bundled cables 86*a,b*. As the dock 20 extends and retracts, the bundled cables 86*a,b* respectively extend from, and recoil back into, foundation mounted cable housings 88*a,b*.

(c) Dock Support Frame

Figure 4:
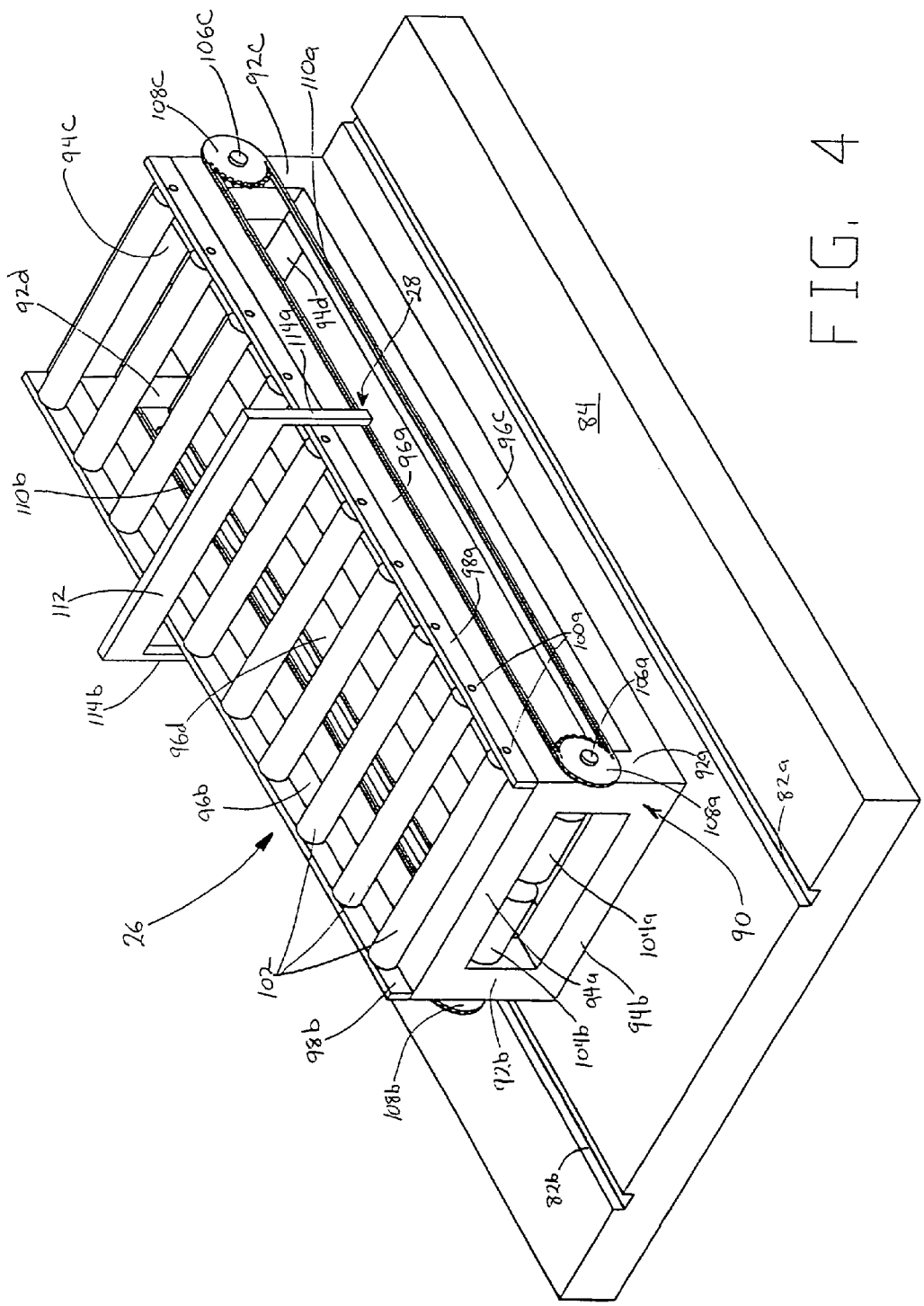
FIG. 4 is an isometric rear view of the dock support platform and dock unloading mechanism of the automated cargo loading system of FIG. 1.

Referring to FIG. 4, the dock support frame 26 provides structural support for the extensible dock 20 (see FIG. 1) and supports the drive trains for the dock unloading mechanism 28. In the preferred embodiment, the dock support frame 26 comprises a rectangular boxed framework 90 fabricated by connectively welding a set of steel box beams which include, four vertical corner posts 92a-d, four horizontal lateral beams 94a-d, and four horizontal longitudinal beams 96a-d. The horizontal box beams 94a-d, 96a-d are sized such that the perimeter of the framework 90 corresponds with the downward projecting face of the retracted dock plate 34 (see FIG. 1), and the vertical corner posts 92a-d are sized to assure that the bottom face of the extended dock plate 34 slidingly enters the trailer bed 38 (FIG. 3).

Welded on the top face of each upper longitudinal beam 96a, b, and adjoining its outer lateral face, is an elongated steel plate 98a, b comprising a linear array of circular apertures 100a,b. The circular apertures 100a, b serve as receptacles for the axle ends of standard industrial rollers 102 which are distributed in a linear array along the top of the frame 90. The rollers 102 are configured to protrude above the top edge of the elongated plates 98a,b and are individually aligned with their axles perpendicular to the frame length. The rollers 102 provide a support surface for the underside of the dock plate 34, allowing it to longitudinally extend, but laterally restricting its motion by frictional contact.

Upon installation, the support frame 26 is centered laterally between the rack alignment slots 82a, b formed in the foundation 84. Longitudinally, the support frame 26 is positioned such that when the dock plate 34 is in its retracted position, the vertical projections of the framework 90 and dock plate 34 coincide. Once positioned, the lower longitudinal beams 96c, d of the support frame 26 are secured to the foundation 84 by mechanical fasteners.

Figure 5:
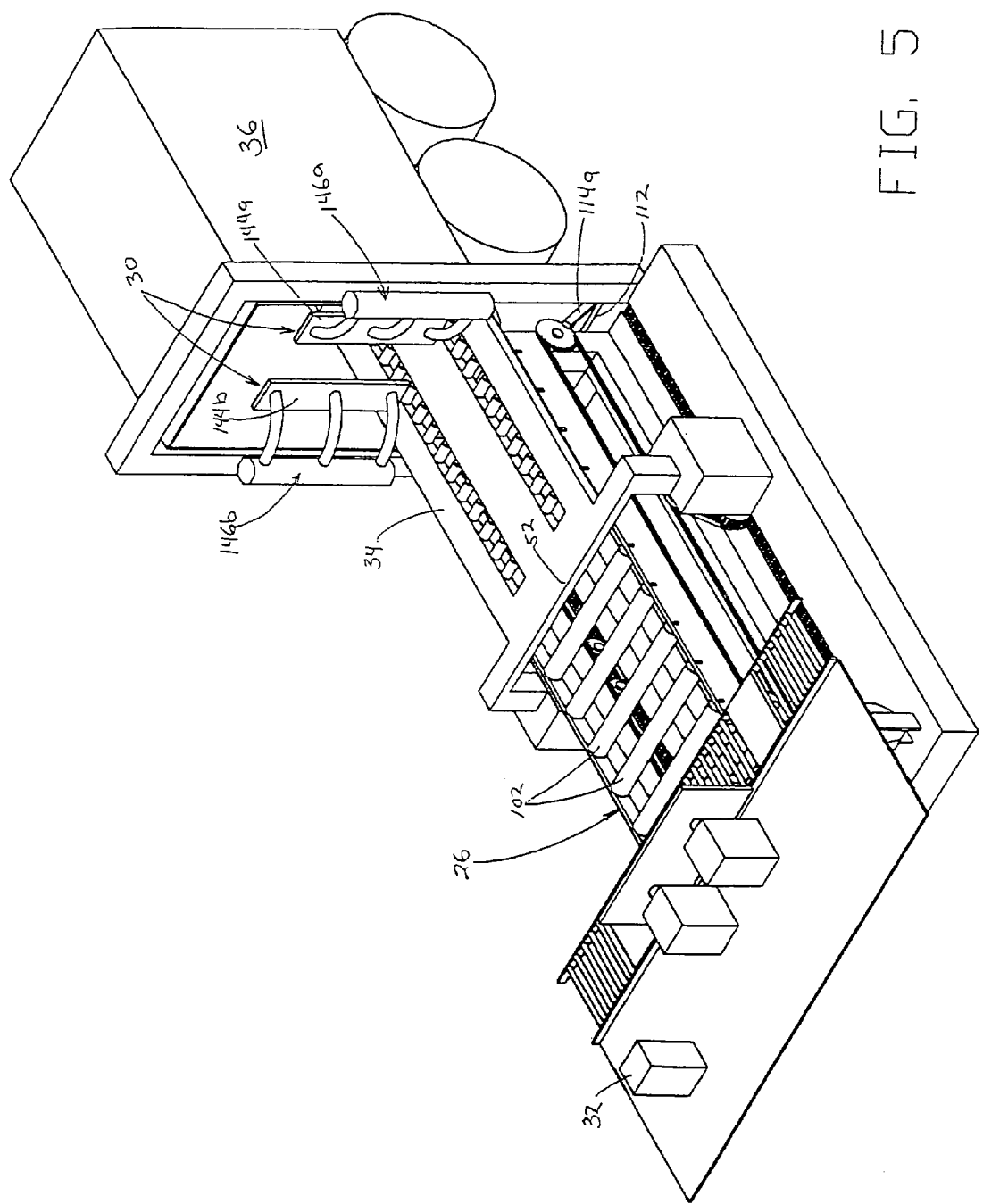
FIG. 5 is an isometric rear view of the automated cargo loading system of FIG. 1, installed adjoining the door frame of a truck docking bay with a trailer aligned for loading/unloading, and with the dock plate partially extended and the cargo restraint mechanism activated.

Referring also to FIG. 2, when assembled, the bottom face of the dock plate 34 rests on the support frame's rollers 102 and the drive pinions 76a-d, mounted on the ends of the dock's outrigger arms 58a, b, engage the toothed drive racks 80a, b. When retracted, the dock plate 34 is fully supported by the rollers 102 and maintains the position shown in FIG. 1. However, by powering the drive pinions 76a-d in the forward direction, the dock plate 34 can be extended as shown in FIG. 5 in which the dock plate 34 has been partially extended into the box of a trailer 36. In this extended configuration, the tail end 52 of the dock plate 34 is supported by the support frame rollers 102, and the leading end 40 is support by the bed 38 of the trailer 36. At full extension, the dock plate's tail end 52 remains supported on the support frame's rollers 102, but its leading end extends forward to cover the entire length of the trailer bed 38.

(d) Unloading Mechanism

Referring to FIG. 4, in the preferred, embodiment, the dock unloading mechanism 28 comprises four synchronized, reversible electric stepper motors 104a-d, one adjoining each of the support frame's vertical corner posts 92a-d. The two rear motors 104a,b are connected by mechanical fasteners to the underside of the support frame's upper rear lateral beam 94a, and the two front motors 104c,d are connected by mechanical fasteners to the underside of the support frame's upper front lateral beam 94c. Each motor 104a-d comprises a drive shaft 106a-d which extends laterally outward, through an aperture in the corresponding corner post 92a-d, and respectively engages a toothed sprocket 108a-d. A right drive chain 110a engages the two right sprockets 108a,c, and a left drive chain 110b engages the two left sprockets 108b,d.

An elongated, rectangular steel paddle 112, having a length proximately equal to the separation distance between the two drive chains 110a,b, is laterally disposed above the support frame 26. A steel extension arm 114a,b extends from each lateral end of the paddle 112, and connects, by mechanical fasteners, to the upper span of the corresponding drive chain 110a,b. The arms are configured in length such that the paddle 112 translates just above the dock plate rollers 48a,b (see FIG. 1) when the dock 20 is assembled to the support frame 26 and the stepper motors 104a-d are activated. The unloading paddle is preferably only a few inches tall above the dock plate (e.g., 4-5 inches high), no higher than the height of the pallets, so that the plate pushes only against the pallets and not against the cargo carried thereon, thereby obviating the possibility of upsetting the palletized loads or changing the cargo itself.

Connections for electrical power and wired interfaces to the control computer 32 are supplied to the stepper motors 104a-d by bundled cables (not shown). The control computer 32 controls the synchronized stepper motors 104a-d which effect the translational motion of the unloading paddle 112 which, during loading, assumes an initialized position adjoining the leading end 40 of the dock plate 34, and which, during unloading, assumes an initialized position adjoining the trailing end 52 of the dock plate. From these initialized positions, the control computer 32 translates the paddle 112 towards the opposite end of the dock plate in discrete stepped increments corresponding to the length of the cargo pallets. When extending the dock during loading, or when the unloading mechanism 28 is not in use, the unloading paddle 112 is stowed in an unobstructive position (shown in FIG. 5) below the dock plate 34 and adjoining the lower, front lateral beam 94d on the front end of the support frame 26. This is accomplished by full translation of the paddle 112 towards the leading end 40 of the retracted dock 34, followed by additional rotation of the motorized sprockets 108a-d such that the paddle rotates off the leading end of the retracted dock.

(e) Conveyor Elements

Referring to FIG. 1, in the preferred embodiment, palletized cargo is transported to and from the dock via a network of communicating conveyor elements including the dock transfer (DT) conveyor 18, two feed control (FC) conveyors 16a,b, and two point of inventory (POI) conveyors 14a, b.

The DT conveyor 18 is a modular section of standard, commercially available conveyor comprising a conventional array of steel roller elements 116 unitized in a frame structure 118 and powered, via a coupled drive chain (not shown), by a reversible electric stepper motor (not shown). The width of the modular unit is configured to equate to the width of a standard pallet, and its length is configured to proximately correspond with the width of the dock plate 34. When installed, the DT conveyor 18 runs normal to the length of the dock 20 and adjoins the tail end 52 of the fully retracted dock plate 34. Its position is centered with respect to the dock width and elevated such that the top face of the dock plate 34 and the support surface of the rollers 116 lie in the same plane, allowing cargo pallets to be easily transferred between the dock plate and conveyor.

Connections for electrical power and wired interfaces to the control computer 32 are supplied to the DT conveyor's drive motor by bundled cables (not shown). The control computer 32 functionally controls the DT conveyor 18 which is programmed to deactivate into neutral during the loading operation, and reactivate during the unloading operation in order to transport offloading pallets to the appropriate FC conveyor 16a,b.

The feed control (FC) conveyor's 16a,b are also modular sections of standard, commercially available conveyor comprising conventional arrays of steel roller elements (not shown) unitized in frame structures 120a,b and powered, via coupled drive chains (not shown), by reversible electric stepper motors (not shown). The width of these units is comparable to that of the DT conveyor 18. A high friction transport surface is provided by a rubberized belt 122a,b, commonly used in conveyored material handling applications, which encapsulates the rollers on each FC conveyor 16a,b. One FC conveyor 16a,b is installed adjoining each end of the DT conveyor 18, and the three are linearly aligned to assure smooth transfer of cargo between the conveyor elements.

Connections for electrical power and wired interfaces to the control computer 32, which controls the FC conveyors 16a,b, are supplied to the FC conveyor drive motors by bundled cables (not shown). During unloading, the FC conveyor down stream of the cargo flow, as determined by the direction of flow from the DT conveyor 18, is in continuous operation transferring pallets from the DT conveyor to the downstream POI conveyor 14a,b. The other FC conveyor is not required and can be temporarily decommissioned. During loading, one FC conveyor is active while the other is braked to prevent cargo from exiting the down stream side of the DT conveyor 18. The active FC conveyor transfers pallets from the POI conveyor 14a,b to the DT conveyor 18 in an intermittent manner which is coordinated with the operation of the dock loading mechanism 24 and controlled by the control computer 32 in conjunction with the feed control sensors 22a,b as previously discussed.

In the preferred embodiment, the point of inventory (POI) conveyors 14a,b are modular sections of standard, commercially available conveyor comprising conventional arrays of steel gravity feed roller elements 124a,b unitized in frame structures 126a,b. The width of these units is comparable to that of the other conveyor units, and one is aligned with and installed adjoining the free end of each FC conveyor 16a,b. In general, the POI conveyors 14a,b are configured according to the layout and requirements of the facility in which it is installed. Thus additional conveyor elements, including interspersed sections of powered conveyor, may be required to route cargo to the appropriate destination.

(f) Dock Loading Mechanism and Feed Control Sensors

Referring to FIG. 3, in the preferred embodiment, the dock loading mechanism 24 comprises a rectangular, vertically oriented, steel pusher plate 128 with a length corresponding to the DT conveyor length and a height comparable to that of a loaded pallet. The pusher plate 128 serves as the contact surface for transferring palletized cargo from the DT conveyor 18 to the dock plate 34, and is accordingly aligned with and centered along the length of the DT conveyor 18 which is correspondingly centered along the width of the dock 20.

The pusher plate 128 is supported proximately mid-height by two horizontally disposed, hydraulic, linear actuators 130a,b which are aligned perpendicular to the DT conveyor length and supported in rectangular boxed steel housings 132a,b secured to a fixed platform 134. The housings 132a,b are positioned such that the pusher plate 128 adjoins the side of the DT conveyor 18 opposite the dock 20 when the actuators 130a,b are in their retracted position. The length of the actuators 130a,b is configured to span the width of the DT conveyor 18 when extended, such that the push plate 128 will contact any pallets loaded on the DT conveyor and transfer them to the retracted dock plate 34. The support height of the pusher plate 128 above the fixed platform 134 is configured such that the plate contacts the pallet yet does not interfere with the DT conveyor rollers 116.

Referring also to FIG. 1, the feed control sensors 22a,b comprise standard, commercially available infrared sensor elements that detect the presence of an object which interferes with its emission beam. The feed control sensors 22a,b are recessed into the surface of the push plate 128 facing the DT conveyor 18 and are located proximately mid-height adjoining its lateral edges. This positioning allows the sensors 22a,b to determine when the DT conveyor 18 is fully loaded with pallets. Since the length and position of the push plate 128 and DT conveyor 18 coincide, and the sensors 22a,b are mounted at terminal ends of the plate, when both sensors detect interference the DT conveyor must be full and ready for offloading. This signal can be relayed to the control computer 32 which connects to both the sensors 22a,b and loading mechanism 24 by appropriate wiring. The control computer 32 subsequently sends a signal to activate the loading mechanism's hydraulic actuators 130a,b which extend forcing the push plate 128 into the loaded pallets and transferring them to the dock plate 34. When the push plate 128 is retracted, the control computer resets the feed control sensors 22a,b in preparation for the next batch of cargo.

(g) Cargo Restraining Mechanism

Referring to FIG. 3, palletized loads accumulated on the dock plate 34 are transferred to the trailer 36 by fully extending the dock plate into the trailer bed 38. The cargo restraining mechanism 30 is required to restrain the load within the trailer 36 when the dock plate 34 is subsequently retracted. The cargo restraining mechanism 30 may comprise a set of elongated, hinged, steel hub cylinders 138a,b aligned vertically and secured to the inside of the vertical posts 140a, b comprising the truck bay door frame 12. A vertical array of three horizontally disposed, arced, cylindrical, steel tubes 142a,b is butted to each hub cylinder 138a,b and welded, and a restraining panel 144a,b comprising a vertically oriented rectangular steel plate is butted and welded to the opposing ends of each tubular array 142a,b. These assemblies together form a set of cargo restraining gates 146a, b configured to opposingly rotate about their respective vertical hub axes.

Each hinged hub cylinder 138a,b is coupled to a reversible, electric stepper motor (not shown) which is connected to a power source and the control computer 32 by appropriate wiring (not shown). As shown in FIG. 3, the restraining mechanism gates 146a,b are in the open position allowing a loaded dock plate 34 to extend and deliver palletized cargo to the trailer 36. However, when directed by the control computer 32, the gates 146a, b swing closed, obstructing the cargo entrance as shown in FIG. 5. As the dock plate 34 is subsequently retracted, the restraining mechanism restraining panels 144a, b blocks the pallets, allowing the dock plate to slide out from underneath the palletized cargo.

(h) Control Computer and Operation

Referring to FIG. 3, the control computer 32 comprises a CPU, memory, programmed software, display terminal, keyboard and appropriate interfacing to connect with and control the various components of the automated cargo loading system. In the preferred embodiment, the control computer 32 is installed on the platform 134 adjoining the docking site so that a single operator can visually monitor and control the loading/unloading operation. The control logic of the control computer 32 can be understood by a description of the automated cargo loading system during the loading/unloading operations.

During loading, palletized cargo 150 is sequentially placed on the POI conveyor 14b and transferred to the FC conveyor 16b. When the first pallet arrives at the FC conveyor 16b, the FC conveyor will be running, and the first pallet will immediately be transferred to the DT conveyor 18 by the FC conveyor's rubber belt 122b. During the entire loading operation, power to the DT conveyor's powered rollers 116 is suspended. Thus the first pallet will simply roll on the DT conveyor 18 by its own momentum. If the pallet reaches the opposite end of the DT conveyor, either by momentum or the urging of ensuing pallets, the rubber belt 122a on the opposing FC conveyor 16a, rendered inoperative by the computer control system 32, will arrest its forward motion. Subsequent pallets will be transferred to the DT conveyor 18 in the same manner until both feed control sensors 22a, b (FIG. 1) become obstructed by cargo loads. When both sensors are blocked, indicating that cargo pallets have filled the DT conveyor 18, the FC conveyor 16a is shut down, restricting the flow of additional pallets to the DT conveyor. The pallets may then be transferred from the DT conveyor 18 to the retracted dock plate 34 by activation of the dock loading mechanism 24.

Prior to commencing the loading process, the control computer 32 assures that the dock plate 34 is in the retracted position, and initializes the unloading paddle 112 which acquires a start position adjoining the tail end 52 of the retracted dock. The unloading paddle 112 serves as a backstop for the onloading pallets and restrains excessive forward travel. As the DT conveyor 18 transfers pallets to the dock plate 34, the unloading paddle 112 simultaneously translates a stepped incremental distance, equivalent to the pallet length, towards the leading end 40 of the dock plate. Thus, the paddle makes room for the oncoming pallets, but prevents them from inadvertently traveling off the end of the dock.

Once the first set of pallets have loaded, the dock loading mechanism 24 will retract and the optical feed sensors 22a, b will reset. This reinitiates the FC conveyor 16b operation which begins feeding the next batch of pallets to the DT conveyor 18. The cycle continues until the unloading paddle 112 reaches a terminal position adjoining the leading edge 40 of the dock plate 34. The computer 32 registers this occurrence, which indicates that the dock is full, and suspends operation of the dock loading mechanism 24 until the pallets on the loaded dock are transferred to the trailer bed 38.

If the trailer 36 is already docked, the unloading paddle 112 is rotated into its stowed position in preparation for loading the trailer. Otherwise, the unloading paddle remains in position to secure the end of the loaded dock until the trailer arrives. Once the trailer arrives, it is backed into the docking bay door frame 12 and aligned with the dock plate 34 using a combination of visual and electronic alignment means. The unloading paddle 112 is then stowed, and the loaded dock plate is fully extended into the bed 38 of the trailer 36. After activating the gates 146a, b on the cargo restraint mechanism 30, the dock plate is retracted, depositing the cargo load on the trailer bed 38. Once the dock plate 34 retracts, the dock loading mechanism 24 can be reactivated to reload the dock plate in preparation for the next trailer shipment.

When unloading is required, the dock plate 34 is retracted, the unloading paddle 112 is stowed, and the loaded trailer 36 is aligned in the docking bay door frame 12 as previously discussed. The dock plate 34 is then extended into the trailer 36 such that its wedged leading end 40 is forcibly levered between the trailer bed 38 and the palletized trailer load. Once the truckload of pallets is resting on the dock plate 34, the dock plate is retracted. At this point, the motorized rollers on the DT conveyor 18 and FC conveyor 14b are activated, and the unloading paddle 112 begins to operate. The unloading paddle sequentially transfers individual rows of pallets to the DT conveyor 18 by translating towards the tail end 52 of the dock in stepped increments equal to the pallet length. Rows of pallets entering the DT conveyor 18 are transported by its powered rollers 116 to the FC conveyor 16b which relays the cargo to the POI conveyor 14b. Once on the POI conveyor, the pallets are directed to the appropriate destination. This process continues until all the pallets have been removed from the dock plate, at which time the system may reinitiate in preparation for the next operation.

A barcode scanner/reader may be employed in certain embodiments to sort bar-coded pallets or cargo, particularly to sort pallets/cargo for loading into different trailers of multiple-bay installations. Similarly, other forms of identification systems and the associated sensors, such as wireless RFID coding, for example, may also be integrated with the systems of the present invention.

(i) Automated Warehousing System

Figure 6:
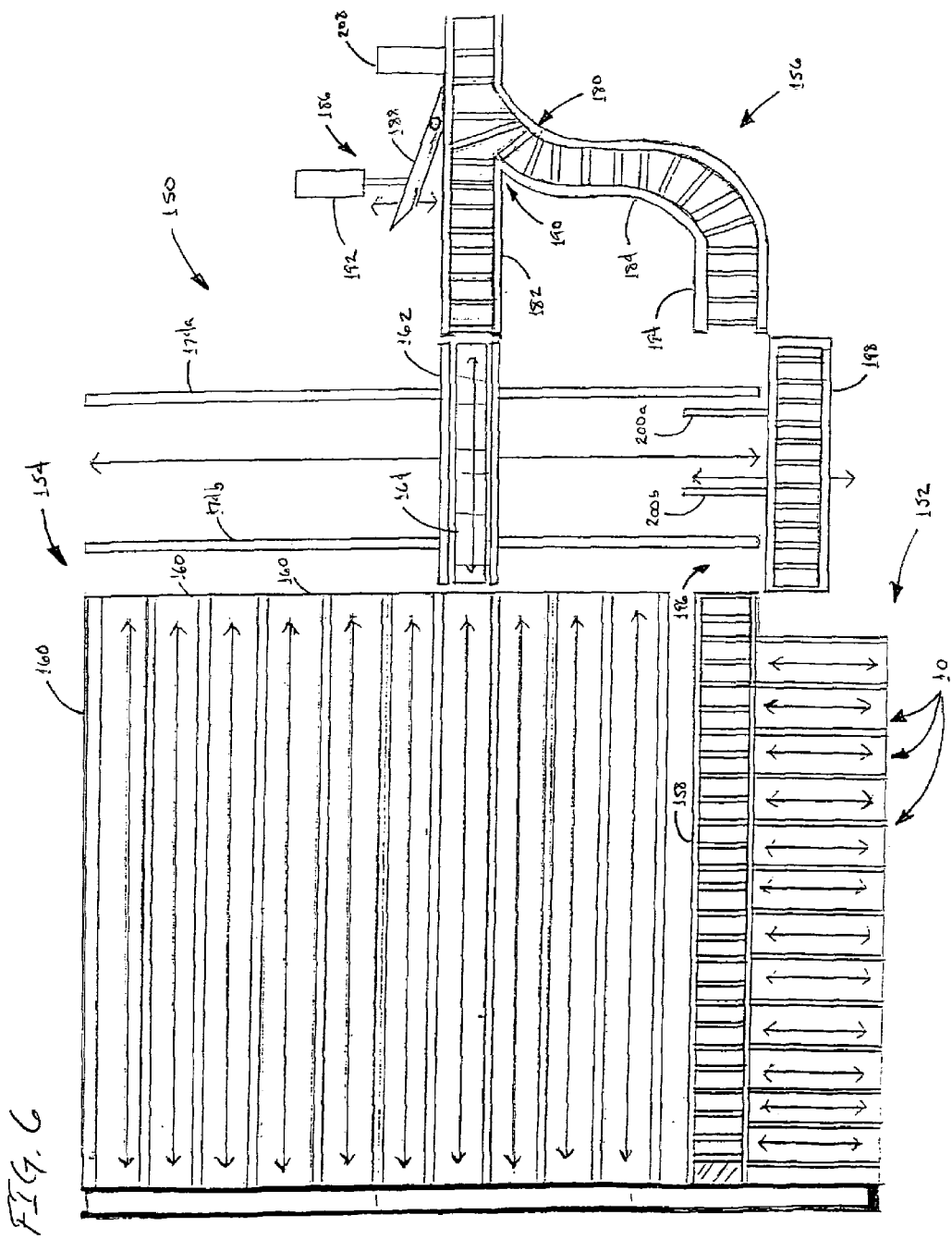
FIG. 6 is a plan, somewhat schematic view of an integrated warehousing system combining an automated inventory system with the automated loading and unloading system of FIGS. 1-5.

FIG. 6 shows an integrated warehousing system 150 that incorporates a loading/unloading section 152 having a plurality of the automated loading/unloading docks 10 described above with a modular storage section 154 and a feed section 156 for routing palletized cargo to either the storage or loading/unloading sections. The embodiment that is illustrated in FIG. 6 is configured to be suitable for use in facilities for either receiving or distributing palletized cargo (or both), but, it will be understood that the system can be modified and/or simplified somewhat to strictly receive or dispatch cargo, should that be desired.

The automated cargo loading/unloading units 10 that make up the loading/unloading section are the same as has been described above, the plurality of the units being arranged at bays or cargo doors and interconnected by the loading and unloading conveyer assembly 158.

Figure 7:
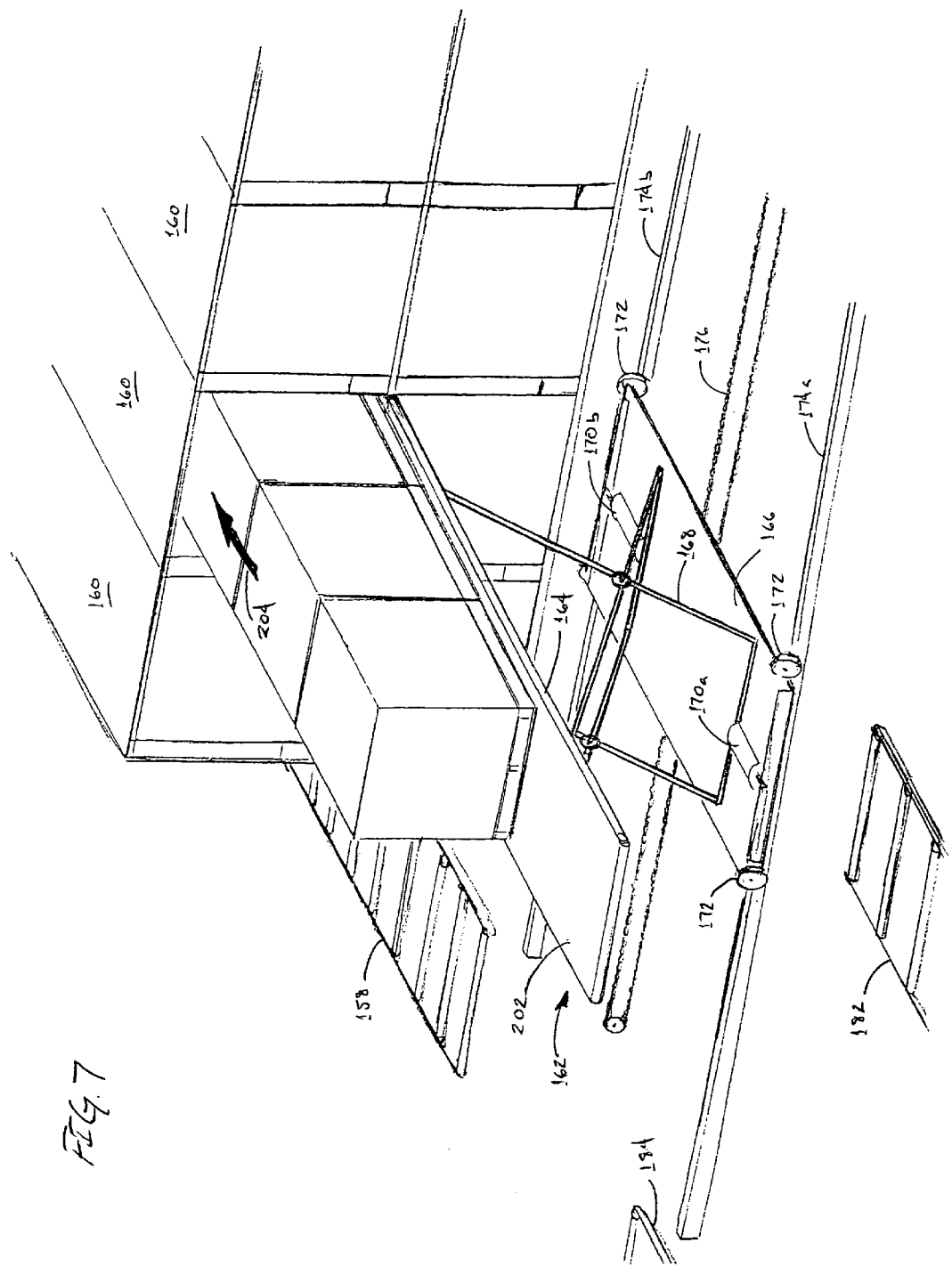
FIG. 7 is a front, isometric view of a portion of the automated inventory system of the warehouse system shown in FIG. 6, showing the manner in which a cargo conveyer of the warehousing system is elevatable so as to store and retrieve palletized loads from the storage racks thereof.

The storage section 154, in turn, includes a plurality of stacked, modular storage racks 160. Each of the storage racks is sized to hold a plurality of pallets loaded with cargo, preferably a sufficient number of pallets to form a complete load for a trailer or truck. As can be seen in FIG. 7, the storage racks 160 are stacked vertically upon one another, so as to form a tiered assembly that makes maximum use of the available footprint.

The storage racks are accessed by a traveling conveyer 162. As can be seen, the traveling conveyer includes a conveyer deck 164 that is aligned longitudinally with the rack modules 160. The conveyer deck is supported from a chassis 166 by a jack mechanism 168, by which the conveyer deck is selectively raised or lowered to be level with the storage modules in each of the tiers. In the illustrated embodiment the jack mechanism is a scissors-type assembly operated by hydraulic cylinders 170a, 170b; it will be understood, however, that other forms of jack mechanisms may be employed in other embodiments.

Wheels 172 support the chassis 166 in first and second transverse, parallel channels 174a, 174b. A drive chain 176 or other drive mechanism is attached to the chassis for moving it and the associated conveyer deck laterally between the storage racks and also into alignment with the conveyers of the feed section, as will be described in greater detail below.

Referring again to FIG. 6, it will be seen that the feed section 156 includes a forked or branched conveyer assembly 180 having a first, straight section 182 that leads to the traveling conveyer and storage racks, and a second, curved section 184 that diverges and leads to the loading/unloading section 152; it will of course be understood that the destinations of the straight and curved sections can be reversed, if desired.

A routing assembly 186 is provided for directing cargo to either the storage or loading/unloading sections, and includes a sweep arm 188 that is pivotally mounted for movement over the conveyer assembly proximate junction 190. The sweep arm is actuated by a hydraulic cylinder 182, for allowing palletized cargo to proceed directly along the straight section 182 or for redirecting it around the curved section 184.

The terminal portion 194 of the curved conveyer section extends substantially parallel to the straight section 182. A spaced gap 196 between the terminal portion 194 and lead conveyer assembly 158 of the loading/unloading units is spanned by a moveable bypass conveyer segment 198. The bypass segment 198 extends generally parallel to the traveling conveyer 162, and is likewise mounted wheels in channels 200a, 200b for lateral movement. This enables a bypass segment to be moved laterally into the gap 196 so as to interconnect the loading/unloading conveyer 158 with the curved conveyor section 184, or out of the gap 196 so as to allow the traveling conveyer 162 to enter this area, as will be described in greater detail below.

In operation, assuming for purposes of illustration that the warehouse is associated with a production or distribution facility, cargo arrives on the feed conveyer assembly from the right in the view shown in FIG. 6. If the cargo is destined for immediate loading, the sweep arm 188 is actuated to direct it onto the curved conveyer section 194 and from there onto the unloading/loading conveyer assembly 158 via bypass segment 198. The cargo is then loaded into outgoing trailers or other transport vehicles in the manner described above.

When the cargo is destined for storage, however, the sweep arm 188 is retained in its retracted position so that the pallets continue in a straight line onto the straight section 182 of the conveyer assembly. The traveling conveyer 162 is maintained in alignment with the distal end of the straight conveyer section, and as the pallets move onto the conveyer deck 164 the conveyer belt thereof is actuated in a stepwise manner so as to move the pallets onto the conveyer deck until it has been loaded to the desired extent. The traveling conveyer is then moved laterally along channels 174a, 174b until it is in alignment with a predetermined row of racks, and the jack mechanism is then actuated to raise the conveyer deck to the level of a selected rack within the row, if necessary. Proper alignment may be ensured by sensors and/or operating commands based on predetermined locations of the components; furthermore, in some embodiments a mechanical interlock may be used to maintain the spatial orientation between the storage rack and the traveling conveyer.

Once in the selected position, the belt 202 (see FIG. 7) of the conveyer deck is actuated to move the palletized cargo into the storage rack, as indicated by arrow 204. As the cargo enters the rack it is picked up by the conveyer belt 206 within the rack itself and drawn into the interior thereof. After the palletized cargo has been offloaded, the jack mechanism is retracted and the traveling conveyer returns to its initial position at the end of the straight section of the feed conveyer to receive the next load.

In this manner, each of the modular storage racks can be loaded to the desired extent, and with the desired combination of products if more than one type of product is being dispatched. For example, in the case of a grocery distribution center, a pallet of cereal, a pallet of soap, a pallet of paper products, and so on can be loaded into a single storage rack, particularly working in junction with a barcode reader or other inventory control system. Once the combined load for a particular destination has been assembled, it can be retrieved en masse and loaded into the trailer for the designated recipient.

In order to retrieve the palletized cargo from the storage racks, the traveling conveyer is moved laterally and vertically into alignment with the selected rack and the conveyer belts 206, 202 are reversed so as to withdraw the pallets onto the conveyer deck 164. The bypass conveyor is moved laterally to open gap 196 between the feed and loading/unloading conveyers, and the conveyer deck 164 is lowered and moved into its place by moving the traveling conveyer over rails 174a, 174b. Once in alignment with the loading/unloading conveyer assembly, the belt 202 of the traveling conveyer is actuated to discharge the cargo onto the loading/unloading conveyer 158, from which it is loaded into the waiting trailers or other transport vehicles via the automated loading units 10.

The deck of the traveling conveyer 162 is preferably at least as long as the predetermined length of the trailers or other containers that are being loaded at the warehouse facility, so that an entire trailer can be loaded with a single operation of the traveling conveyer assembly. Moreover, to ensure full loading of the trailer or other container, a pallet stacker 208 may be mounted to the feed conveyer upstream of the diverter mechanism to stack pallets to the desired height, as necessary. The pallet stacker employs tines (not shown) that are inserted under a pallet to lift it and are then lowered to stack the first pallet atop a following one passing thereunder.

When unloading palletized cargo from arriving trailers or containers, the cargo can be sent directly to a receiving area (to the right in FIG. 6) via the bypass conveyer 198, or they can be loaded onto the deck of the traveling conveyer 162 and entered into the storage racks in the manner described above. From the storage racks, the cargo can then be sent to the receiving area via the straight section 182 of the feed conveyer assembly, or can be returned to the automated loading/unloading units 110 for re-shipment via conveyer assembly 158.

It will be understood that there may be parallel loading/unloading conveyers 158 and associated loading/unloading units on opposite sides of the storage section 154, and that a variety of other feed and receiving conveyer configurations may also be employed. For example, in some embodiments the bypass conveyor segment may be dispersed with and the curved section of the feed conveyor routed around the area for making the traveling and loading/unloading conveyors, although generally at the cost of a larger footprint.

(j) Traveling Conveyer Assembly

Figure 8:
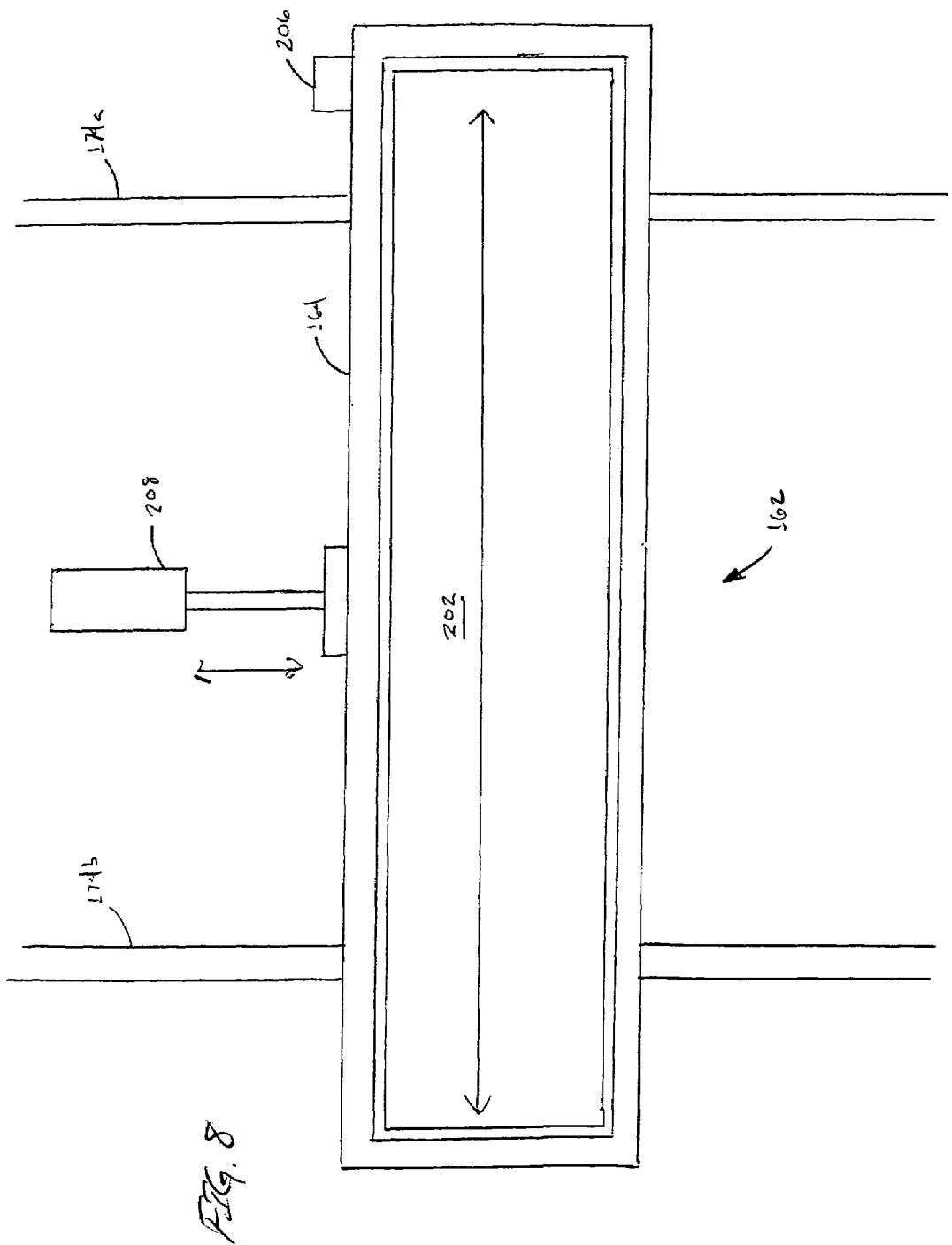
FIG. 8 is a top, plan view of the traveling conveyer of FIG. 7, showing the manner in which this is driven laterally on spaced tracks.

As is shown in FIG. 8, the belt 202 of the upper conveyer deck 164 is driven by a conveyer motor 206, to provide means for propelling the rows of pallets relative to the conveyer deck. The motor is actuated by a controller and sensor to operate in a stepwise fashion, so that pallets are loaded sequentially onto the belt one next to the other until the desired load is in place on the conveyer deck. However, it will be understood that in some embodiments powered rollers or other drive mechanisms, may be used in place of the conveyer belt that is shown in FIG. 8.

FIG. 8 also shows the use of a hydraulic ram 208 to move the traveling conveyer assembly from side to side over the channels 174a, 174b, in place of the chain drive shown in FIG. 7. Consequently, it will likewise be understood that any of a number of suitable drive mechanisms may be used for this purpose, such as a winch, jack screw or drive wheels, for example.

Figure 9:
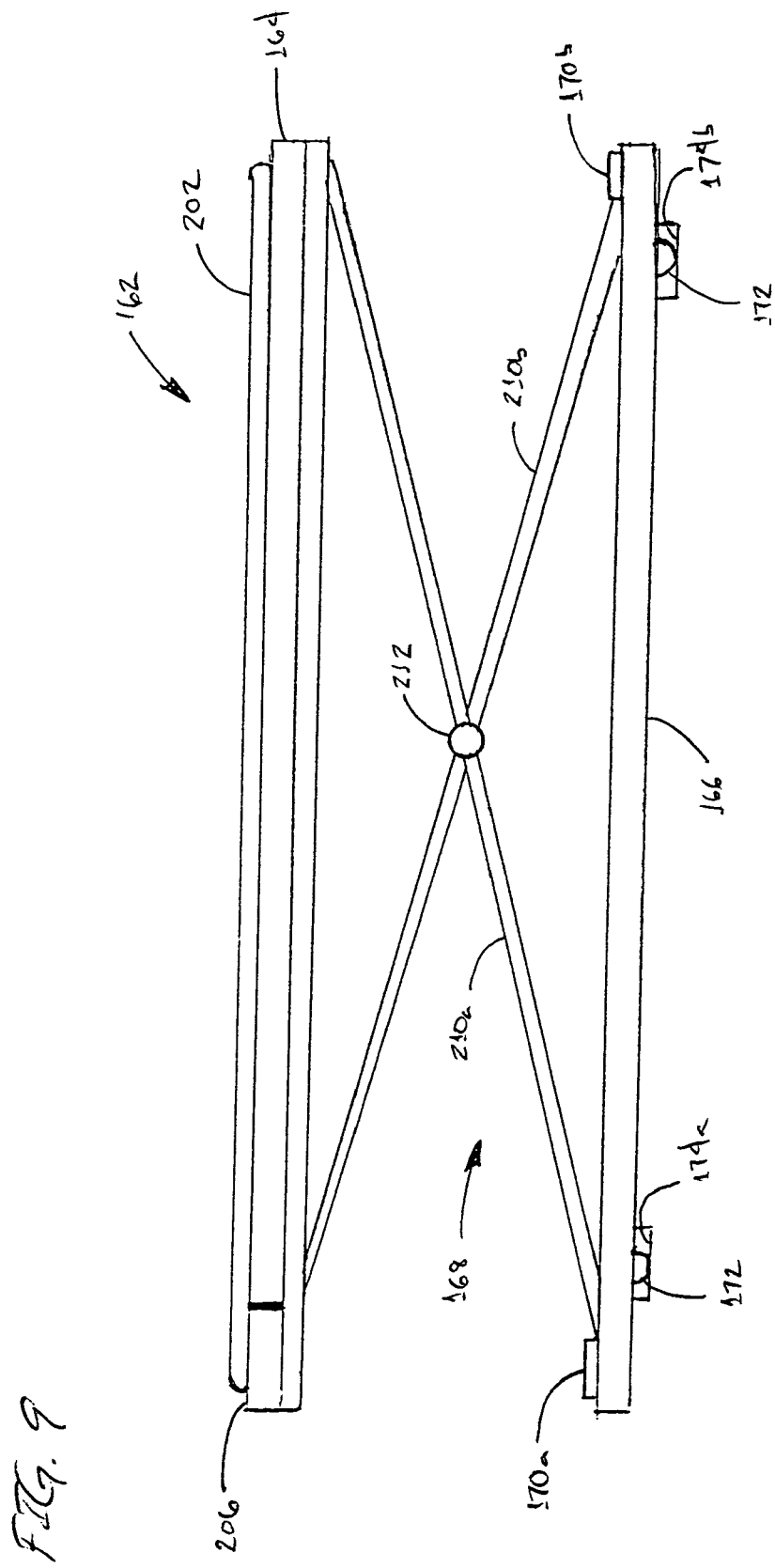
FIG. 9 is a side, elevational view of the traveling conveyer of FIGS. 7-8, showing the scissors mechanism by which the conveyer deck thereof is raised and lowered into alignment with the storage racks of the inventory system.

FIG. 9 shows the traveling conveyer assembly in side view, and in particular the mechanism of the jack assembly 168. As noted assembly, the jack assembly of the illustrated embodiment utilizes a "scissors" configuration, i.e., there are first and second pairs of hinged legs 210a, 210b on either side of the assembly that are interconnected by pivot connections 212. The lower ends of the legs are pivotally connected to the sliding ends of the two hydraulic cylinders 170a, 170b, and the upper ends of the legs are likewise pivotally connected to sliding members (not shown) on the conveyer deck 164. Thus, as the hydraulic pistons 170a, 170b are extended the legs pivot to raise the conveyer deck 164 to the desired height, and as the hydraulic pistons are retracted the deck is lowered. It will be understood, however, that other forms of actuators may be substituted for the hydraulic pistons 170a, 170b, such as a screw-drive mechanism, for example. Moreover, other forms of jack mechanisms may be utilized in addition to the scissors jack mechanism that is shown, such as various forms of hydraulic, screw-operated and chain-drive lift mechanisms, for example.

(k) Modular Rack Assembly

Figure 10:
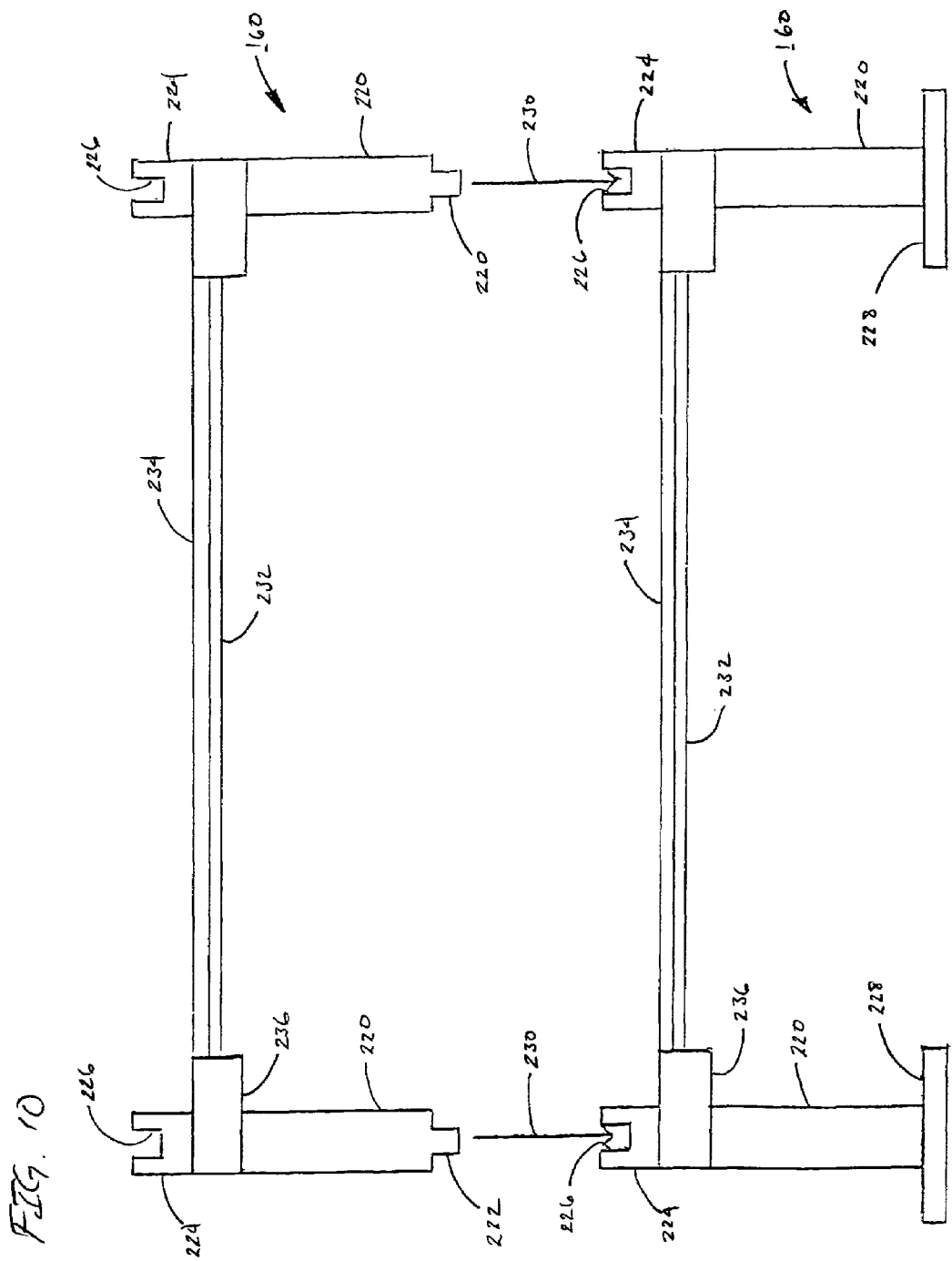
FIG. 10 is a side, elevational view of the modular storage racks of the warehousing system of FIGS. 6-7, showing the manner in which the modular rack units are assembled by vertically stacking the units with the legs thereof in interfitting engagement.

As is shown in FIG. 10, the rack assembly of the preferred embodiment is preferably assembled by stacking modular rack units 160 atop another. Each of the rack units includes four downwardly-projecting columns 220, each of which is provided with a downwardly protruding stud 222 on its lower end. At each corner of the rack units, above and in coaxial alignment with the pillars 220 are short, upwardly projecting posts 224 having receptacles 226 for receiving the studs 222 therein.

To assemble the racks, the studs of the lowermost rack units are inserted in corresponding recesses (not shown) in foot plates 228. Additional rack units are then stacked atop the lower ones by placing the studs 220 in receptacles 226, as indicated by arrows 240 in FIG. 10, until the rack units have been stacked to the desired height.

As was also noted above, each of the rack units includes its own conveyer deck 232 and conveyer belt 234 the latter being driven by a conveyer motor 236. Similar to the traveling conveyer assembly, other drive mechanisms (e.g., powered rollers) may be used in conjunction with or in place of the conveyer belts that are illustrated in FIG. 10.

Figure 11:
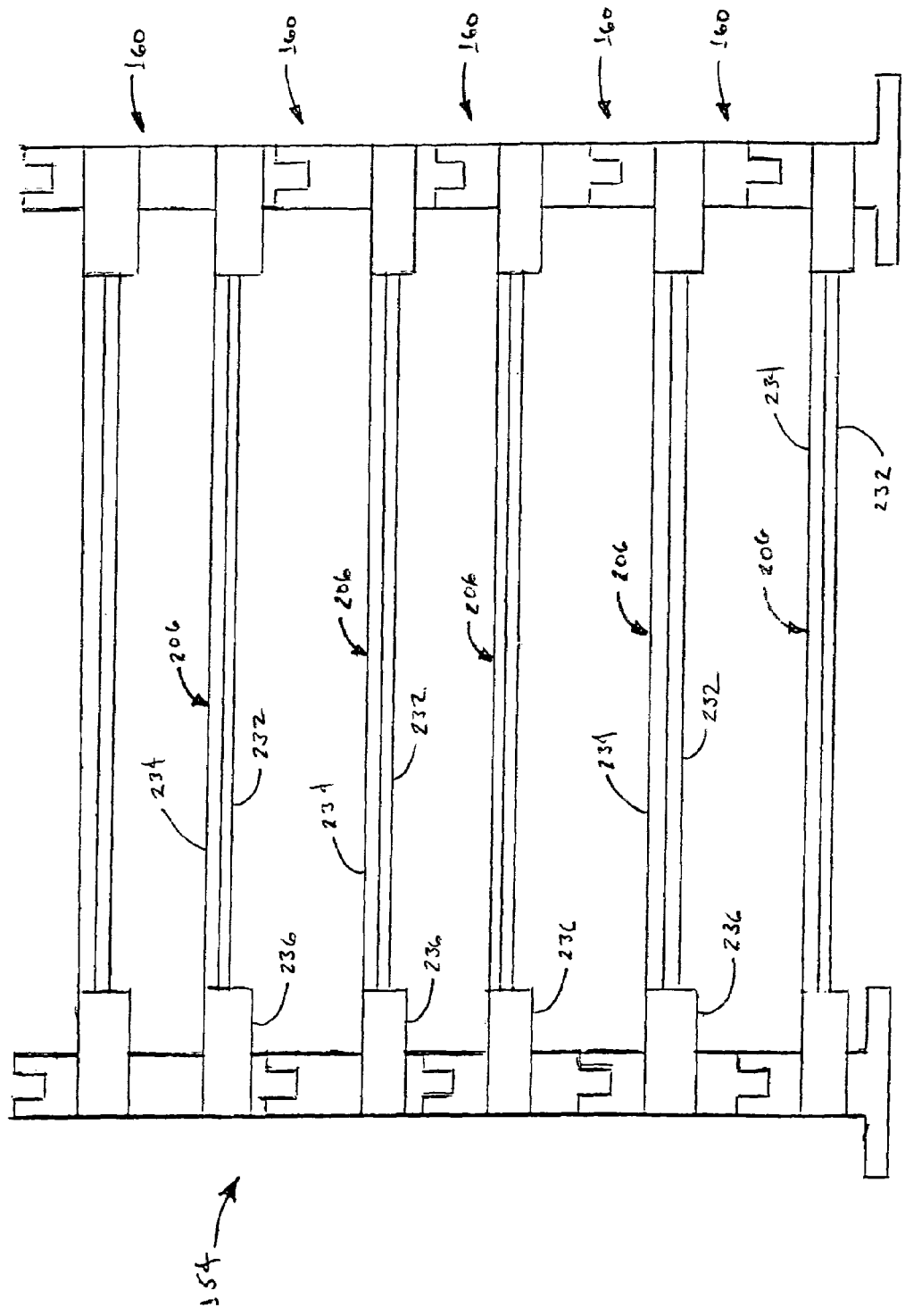
FIG. 11 is a side, elevational view of the storage rack assembly of the warehouse system of FIGS. 6-7, showing the racks stacked to multiple levels after having been assembled as shown in FIG. 10.

With the assembly completed as shown in FIG. 11, the rack units form a rigid structure for storing large quantities of palletized cargo in a compact, space efficient manner.

(l) Feed Conveyer System

Figure 12:
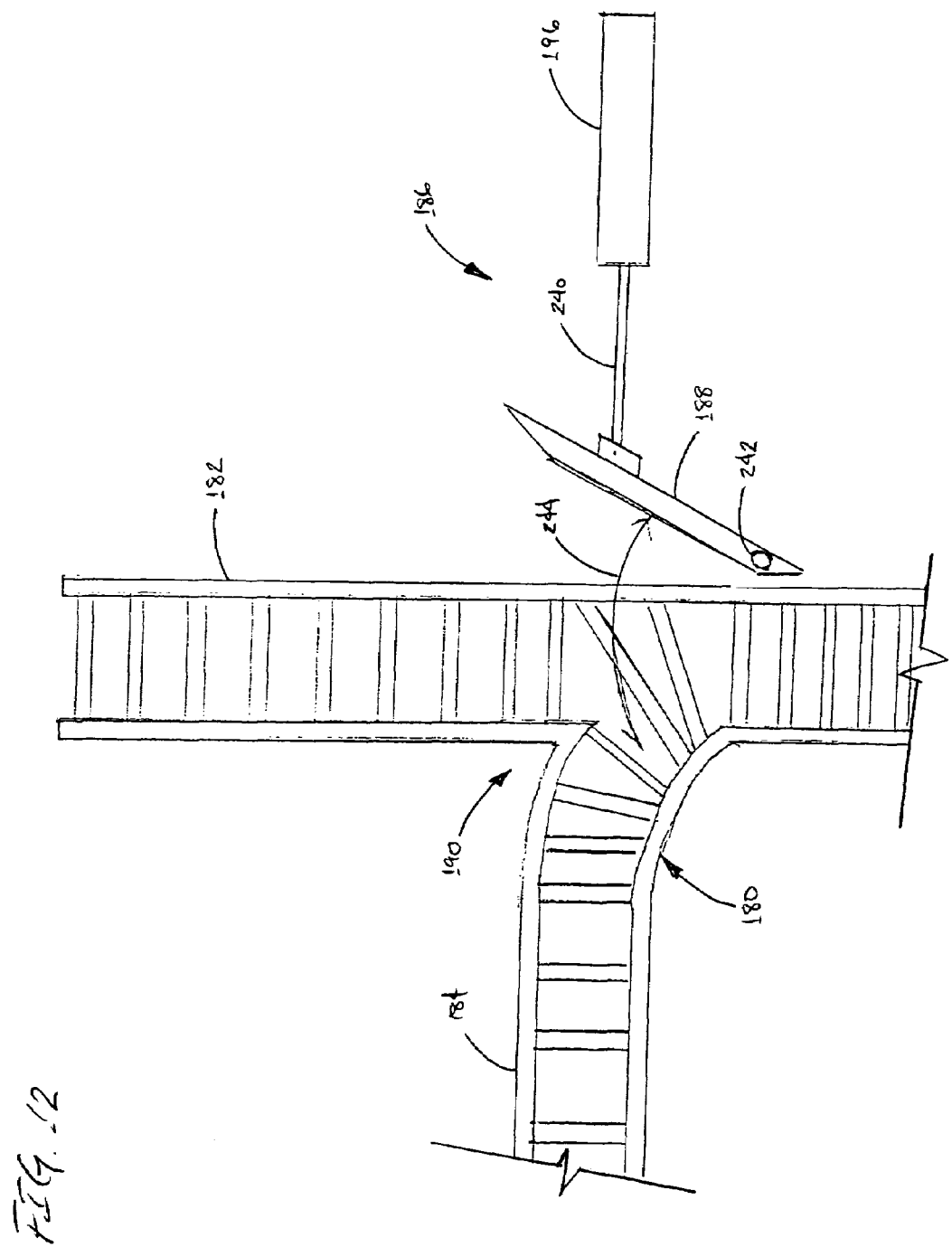
FIG. 12 is a top, plan view of the diversion mechanism of the warehouse system of FIGS. 6-7, showing the manner in which this selectively permits palletized cargo to proceed to storage on the rack assembly, or diverts the cargo to the automated loading/unloading system of FIGS. 1-5.

FIG. 12 shows the feed conveyer 180 and associated diverter mechanisms 186 in greater detail.

As noted above, the sweep arm 188 in the illustrated embodiment is operated by a hydraulic cylinder 196. In response to actuation of the cylinder, rod 240 extends from the cylinder and pivots the sweep arm around about a pivot connection 244 located proximate the conveyer; as this is done, the arm sweeps in the direction indicated by the arrow 244 in FIG. 12. Thus, when the cylinder in its retracted position, palletized cargo passes directly from the feed conveyer to the straight section 182 by its own momentum, and when the cylinder is actuated so as to push the arm to its extended position, the pallets are re-directed onto the curved conveyer section 184. Actuation of the hydraulic cylinder may be linked a bar code reader, an RFID sensor, or other sensor that indicates whether the cargo it to be directed for storage or immediate dispatch of the loading/unloading docks. Alternatively, when an entire run is destined for either storage or immediate shipment, the arm can simply be retained in the retracted or extended position for the duration of the operation.

Figure 13:
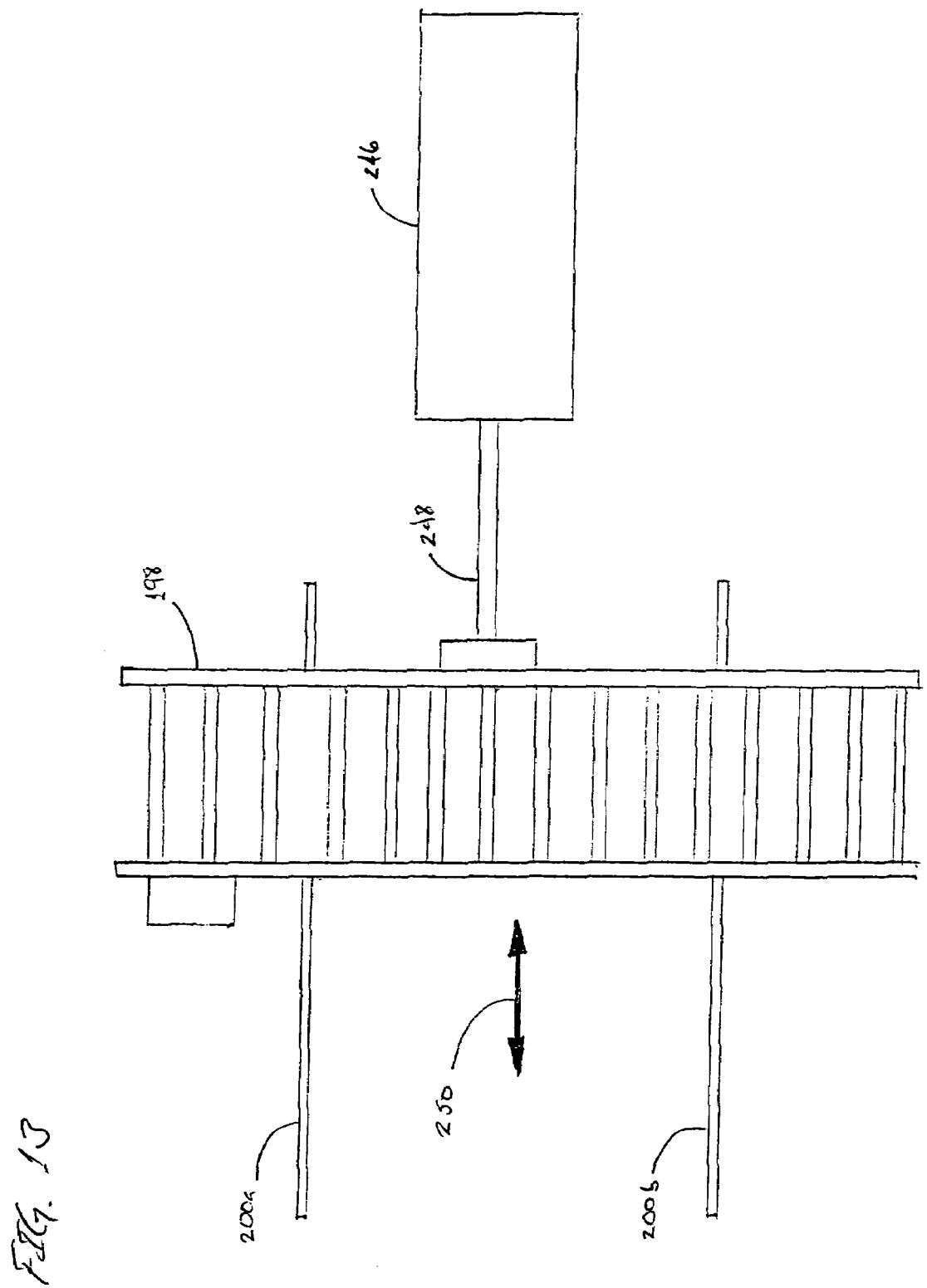
FIG. 13 is a top, plan view of the bypass conveyer assembly of the warehouse system of FIGS. 6-7, showing the manner in which this moves laterally a the first position in which palletized cargo from the diverter of FIG. 12 passes to the automated loading and unloading assemblies, to a second position which permits palletized cargo to be sent to the loading/unloading assemblies from the traveling conveyer of the automated warehousing system.

FIG. 13 shows the bypass conveyer 198 in the manner and which this moves within channels 200a, 200b to open and close the gap 196 (see FIG. 6) as described above. As can be seen, in the illustrated embodiment a hydraulic cylinder 246 is employed to drive the bypass section back-and-forth. Actuation of hydraulic cylinder causes the ram 248 thereof to extend/retract in a direction parallel to the channels 200a, 200b, so as to move the bypass segment at its outer end into and out of the gap, as indicated by arrow 250. Similar to the traveling conveyer described above, alternative drive mechanisms may be employed to move the bypass segment, including a chain drive, jack screw or drive wheels, for example.

The foregoing description of the preferred embodiment of the invention has been presented for the purpose of illustration and description. It is not intended to be exhaustive or to limit the invention to the precise form disclosed. Many modifications and variations are possible in light of the above teaching.

What is claimed is:

1. A warehousing system for palletized cargo, said palletized cargo being sized to fill either two-abreast or singly the width of a standard dry van having a length between about 24 feet and about 53 feet, said system comprising:

a feed conveyer for bringing said palletized cargo to or from said system;

a plurality of storage racks for storing said palletized cargo;

a loading/unloading conveyer for bringing said palletized cargo from or to at least one loading/unloading dock;

said storage racks and said loading/unloading conveyor each comprising an elongate, generally horizontal end portion having a length between about 24 feet and about 53 feet so as to be able to support rows of multiple pallets that form full loads of said palletized cargo, said full loads of said palletized cargo being sufficiently long to fill substantially the entire length of one of said standard highway dry vans;

a traveling conveyer for carrying said full loads of said palletized cargo, said traveling conveyor comprising:

an elongate, generally horizontal deck having a length between about 24 feet and about 53 feet long so as to be able to support said rows of multiple pallets that form said full loads of said palletized cargo; and means for propelling said rows of multiple pallets that form said full loads of said palletized cargo in first and second generally horizontal directions relative to said elongate deck so as to be able to move said full loads of said palletized cargo en masse off either of first or second ends of said elongate deck; and means for selectively moving said traveling conveyer, with said rows of multiple pallets that form said full loads of said palletized cargo supported on said elongate deck thereof, between:

(i) a location in which said elongate deck of said traveling conveyer is aligned longitudinally with said feed conveyer, for longitudinally receiving or discharging said pallets to or from said feed conveyor;

(ii) locations in which said elongate deck of said traveling conveyer is aligned longitudinally with said elongate end portions of said storage racks, for longitudinally receiving or discharging said rows of multiple pallets that form said full loads of said palletized cargo from or to said storage racks en masse; and (iii) a location in which said elongate deck of said traveling conveyor is aligned longitudinally with said elongate end portion of said loading/unloading conveyor, for longitudinally receiving or discharging said rows of multiple pallets that form said full loads of said palletized cargo from or to said loading/unloading conveyor en masse.

2. The warehousing system of claim 1, wherein said storage racks are stacked in tiers at a plurality of elevations.

3. The warehousing system of claim 2, wherein said means for selectively moving said traveling conveyor comprises:
    means for elevating said deck of said traveling conveyor to heights at which said deck of said traveling conveyor is level with said storage racks in said stacked tiers.

4. The warehousing system of claim 3, wherein said means for elevating said deck of said traveling conveyor comprises:
    a scissor-jack mechanism mounted to said deck of said traveling conveyor for selectively raising and lowering said deck to said heights level with said storage racks.

5. The warehousing system of claim 3, wherein said means for selectively moving said traveling conveyor further comprises:
    a wheeled chassis having said traveling conveyor mounted thereon; and
    at least one track for guiding said wheeled chassis between said locations in which said palletized cargo is received or discharged.

6. The warehousing system of claim 1, wherein said feed conveyor further comprises:
    a branch portion that diverges from a main portion of said feed conveyor, for bringing said cargo directly to or from said loading/unloading conveyor without passing to said traveling conveyor.

7. The warehousing system of claim 6, wherein said feed conveyor further comprises:
    means for selectively diverting said palletized cargo from said main portion of said feed conveyor onto said branch portion of said conveyor.

8. The warehousing system of claim 7, wherein said means for selectively diverting said palletized cargo onto said branch portion of said feed conveyor comprises:
    a sweep arm pivotally mounted proximate a junction of said main and branch portions of said feed conveyor; and
    means for selectively extending said sweep arm from a retracted position in which said palletized cargo is permitted to pass along said main portion to said traveling conveyor, to an extended position in which said sweep arm redirects said cargo along said branch portion of said feed conveyor.

9. The warehousing system of claim 6, wherein said branch portion of said feed conveyor comprises:
    a bypass segment connecting said branch portion of said feed conveyor and said loading/unloading conveyor; and
    means for displacing said bypass segment so as to form a gap between said branch portion of said feed conveyor and said loading/unloading conveyor, for receiving said traveling conveyor therein when said traveling conveyor is in said location for receiving or discharging said rows of multiple pallets that form said full load of palletized cargo from or to said loading/unloading conveyor.

10. The warehousing system of claim 1, wherein said at least one loading/unloading dock is an automated cargo loading/unloading system comprising:
    a rigid, extensible dock member having an upper surface with sufficient length to support said rows of multiple pallets that form said full loads of palletized cargo;
    means for extending said dock member into an interior of a transport vehicle so as to carry said rows of multiple pallets that form said full loads of palletized cargo into or out of said transport vehicle en masse; and
    means for selectively restraining said rows of multiple pallets that form said full loads of palletized cargo within said interior of said vehicle as said extensible dock member is withdrawn therefrom.

11. The warehousing system of claim 10, wherein said extensible dock member comprises:
    a beveled leading edge for sliding under said rows of multiple pallets that form said full loads of palletized cargo within said interior of said transport vehicle as said dock member is extended therein.

12. The warehousing system of claim 10, wherein said automated cargo loading/unloading system further comprises:
    means for selectively transferring said palletized cargo from said loading/unloading conveyor to said extensible dock member.

13. The warehousing system of claim 12, wherein said means for selectively transferring said palletized cargo from said loading/unloading conveyor to said extensible dock member comprises:
    a push plate positioned proximate an inner end of said extensible dock member and on an opposite side of said loading/unloading conveyor therefrom; and
    means for selectively extending said push plate so as to push said palletized cargo off of said loading/unloading conveyor and onto said inner end of said extensible dock member.

14. The warehousing system of claim 10, wherein said automated cargo loading/unloading system further comprises:
    means for selectively transferring said palletized cargo from said extensible dock member to said loading/unloading conveyor.

15. The warehousing system of claim 14, wherein said means for selectively transferring said palletized cargo from said extensible deck member to said loading/unloading conveyor comprises:
    an unloading paddle mounted to said extensible dock member;
    means for selectively moving said unloading paddle from a retracted position in which said unloading paddle is positioned beneath an upper surface of said extensible dock member, to a deployed position in which said unloading paddle projects above said upper surface of said extensible dock member proximate an outer end of said dock member; and
    means for translating said unloading paddle in said deployed position from said outer end of said extensible dock member to proximate an inner end of said deck member, so as to push said palletized cargo off of said extensible dock member and onto said loading/unloading conveyor at said inner end of said dock member.

16. An automated cargo loading/unloading system, comprising:
    a rigid, extensible dock member having an upper surface for supporting a load of palletized cargo, said extensible deck member comprising a thin, rigid plate member having said upper surface formed thereon;
    means for extending said dock member into an interior of a transport vehicle so as to carry said load of palletized cargo into or out of said transport vehicle en masse;
    means for selectively restraining said load of palletized cargo within said interior of said vehicle as said extensible dock member is withdrawn therefrom; and
    means for selectively transferring said palletized cargo from said extensible dock member to a loading/unloading conveyor, comprising:

an unloading paddle mounted to said extensible dock member, said unloading paddle extending across substantially a full width of said upper surface of said dock member;

means for selectively moving said unloading paddle from a retracted position in which said unloading paddle is lowered below said thin, rigid plate member so as to be positioned beneath said upper surface of said extensible dock member, to a deployed position in which said unloading paddle is raised over an outer end of said thin, rigid plate member so as to be positioned above said upper surface of said extensible dock member said means for selectively moving said unloading paddle from said retracted position to said deployed position comprising:

first and second extension arms mounted to lateral ends of said unloading paddle so as to extend over side edges of said rigid plate member; and first and second chain drives mounted to said loading/unloading dock generally below said side edges of said rigid plate member, said first and second chain drives comprising chains to which ends of said extension arms are mounted and sprockets located proximate and below said outer end of said rigid plate member, so that in response to said chains passing over said sprockets said extension arms mounted thereto rotate said unloading paddle up and over said outer end of said thin, rigid plate member, from said position in which said unloading paddle is below said upper surface of said loading/unloading dock to said deployed position in which said unloading paddle is above said upper surface of said dock; and means for translating said unloading paddle in said deployed position from said outer end of said plate member to proximate an inner end of said plate member with said unloading paddle extending across substantially said full width of said upper surface of said extensible dock member, so as to push said palletized cargo off of said dock member and onto said loading/unloading conveyor at said inner end of said dock member.

17. The automated cargo loading/unloading system of claim 16, wherein said thin, rigid plate member comprises:
a beveled leading edge for sliding under a load of palletized cargo within said interior of said transport vehicle as said dock member is extended therein.

18. The automated cargo loading/unloading system of claim 16, wherein said means for translating said unloading paddle in said deployed position from said outer end of said thin, rigid plate member to proximate said inner end thereof comprises:
elongate upper runs of said chains of said first and second chain drives having said extension arms mounted thereto, that are located below and extend generally parallel to said side edges of said rigid plate member, that in response to rotation of said drive sprockets draw said unloading paddle over said upper surface of said loading/unloading dock.

* * * * *